(12) United States Patent
Le et al.

(10) Patent No.: US 6,941,220 B2
(45) Date of Patent: Sep. 6, 2005

(54) APPARATUS AND METHOD FOR VEHICLE NAVIGATION

(75) Inventors: Kiem Tinh Le, San Diego, CA (US); Victor Vega Llana, Glendale, CA (US); Christopher Ohren, Palmdale, CA (US); Son Hai Bach, San Diego, CA (US); Dac H. Nguyen, Westminster, CA (US)

(73) Assignee: Center Comm Corporation, San Diego, CA (US)

( * ) Notice: Subject to any disclaimer, the term of this patent is extended or adjusted under 35 U.S.C. 154(b) by 768 days.

(21) Appl. No.: 09/954,618

(22) Filed: Sep. 11, 2001

(65) Prior Publication Data

US 2004/0236498 A1 Nov. 25, 2004

Related U.S. Application Data

(60) Provisional application No. 60/232,074, filed on Sep. 12, 2000.

(51) Int. Cl.[7] .............................................. G06F 15/50
(52) U.S. Cl. ........................ 701/208; 701/209; 701/210; 701/211; 342/357.01; 342/357.08
(58) Field of Search ................................. 701/200–213; 342/357.01–357.14; 340/988, 989, 990

(56) References Cited

U.S. PATENT DOCUMENTS

| | | | |
|---|---|---|---|
| 6,336,072 B1 * | 1/2002 | Takayama et al. | 701/200 |
| 6,336,073 B1 * | 1/2002 | Ihara et al. | 701/202 |
| 6,347,280 B1 * | 2/2002 | Inoue et al. | 701/211 |
| 6,351,706 B1 * | 2/2002 | Morimoto et al. | 701/208 |
| 6,434,479 B1 * | 8/2002 | Kondou et al. | 701/203 |
| 6,539,080 B1 * | 3/2003 | Bruce et al. | 379/88.17 |
| 6,680,694 B1 * | 1/2004 | Knockeart et al. | 342/357.09 |

* cited by examiner

Primary Examiner—Richard M. Camby
(74) Attorney, Agent, or Firm—Lan Q. Ngo; Ngo & Melendez, PLLC

(57) ABSTRACT

A navigation aide device is disclosed that is capable of conveying traveling instructions to a user in possession of the device to allow the user to navigate from a predetermined source position on a predetermined road map, containing road information, to a predetermined destination position on the map, along an optimal road route, under control of travel instructions spoken by the device. Preferably the device includes a position sensor for sensing position of the device and reporting that position, a text to speech converter, a sound conveying device (such as a speaker and associated amplifier) operably connected to the text to speech converter for conveying speech to the user. The device further includes memory for storing a predetermined road map containing road information and a controller. The controller is operably connected to the position sensor, text to speech converter and map memory. The controller calculates an optimal road route between the source position and the destination position, generates a series of text road travel instructions that describe the optimal route in terms of associated road information, receives the report of position by the position sensor during travel, calculates the speed of the device and its direction of travel from the positions reported by the position sensor and determines the road map position corresponding to the reported position based on the position reported, the calculated speed, the calculated direction of travel and the road information. The controller also conveys the series of text road instructions to the text to speech converter. Based on the road map position determined, the controller causes the text to speech converter to convey to the sound conveying device each of the series of text road instructions at a time before the travel has reached the map position corresponding to the particular text road instruction such that the user hears relevant road travel instructions in substantially a timely manner.

5 Claims, 19 Drawing Sheets

(System Block Diagram – Hardware)

FIGURE 1 (System Block Diagram – Hardware)

FIGURE 2 (System Block Diagram – Software)

FIGURE 3 (Process of Creating Map Data)

FIG.5 (Block Diagram of Multiple Device in Preferred Client/Server Mode)
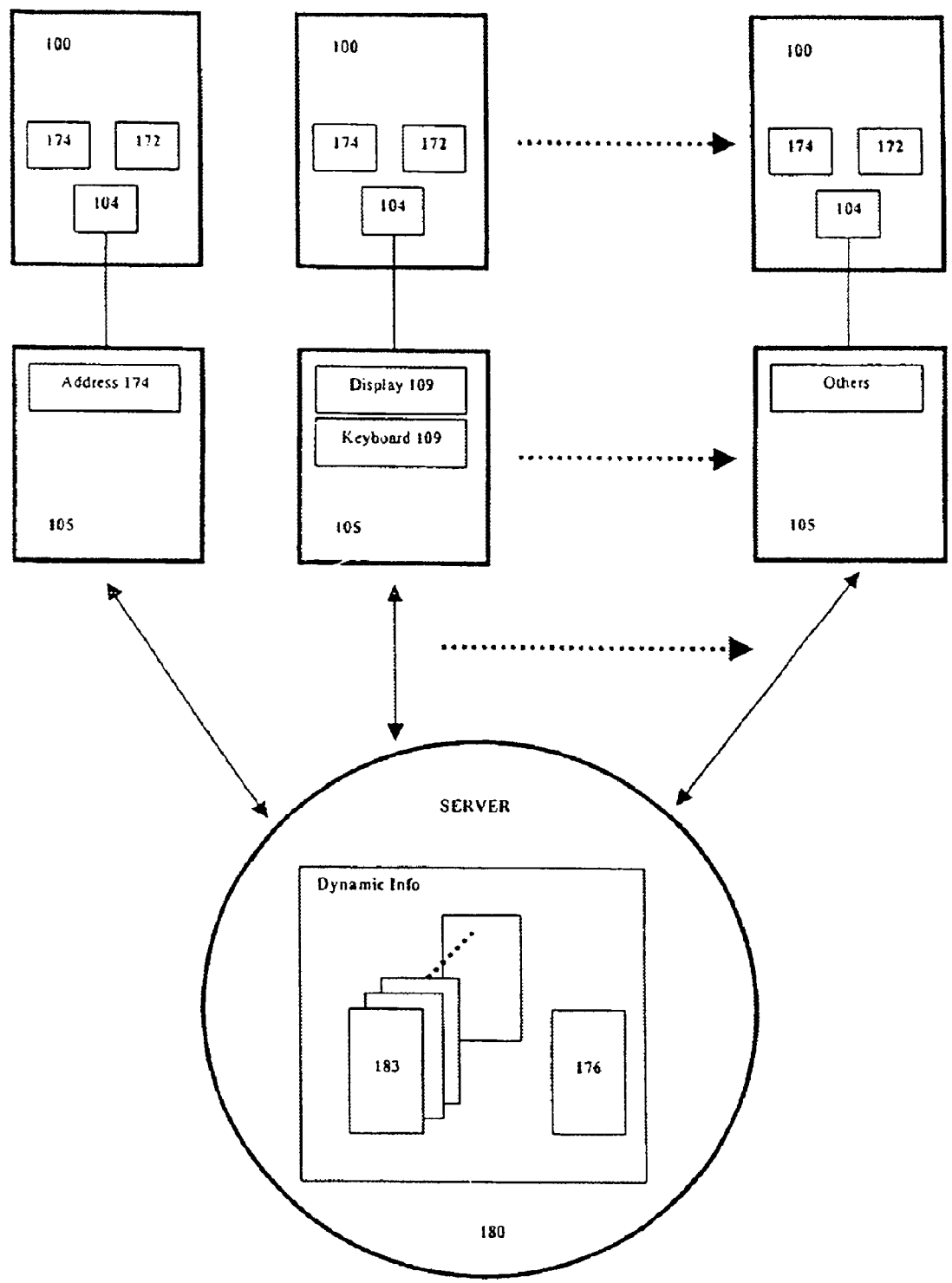

FIGURE 6 (Presentation of Box Search Structure for Acquisition and Tracking Modes for Road Match Software Module)
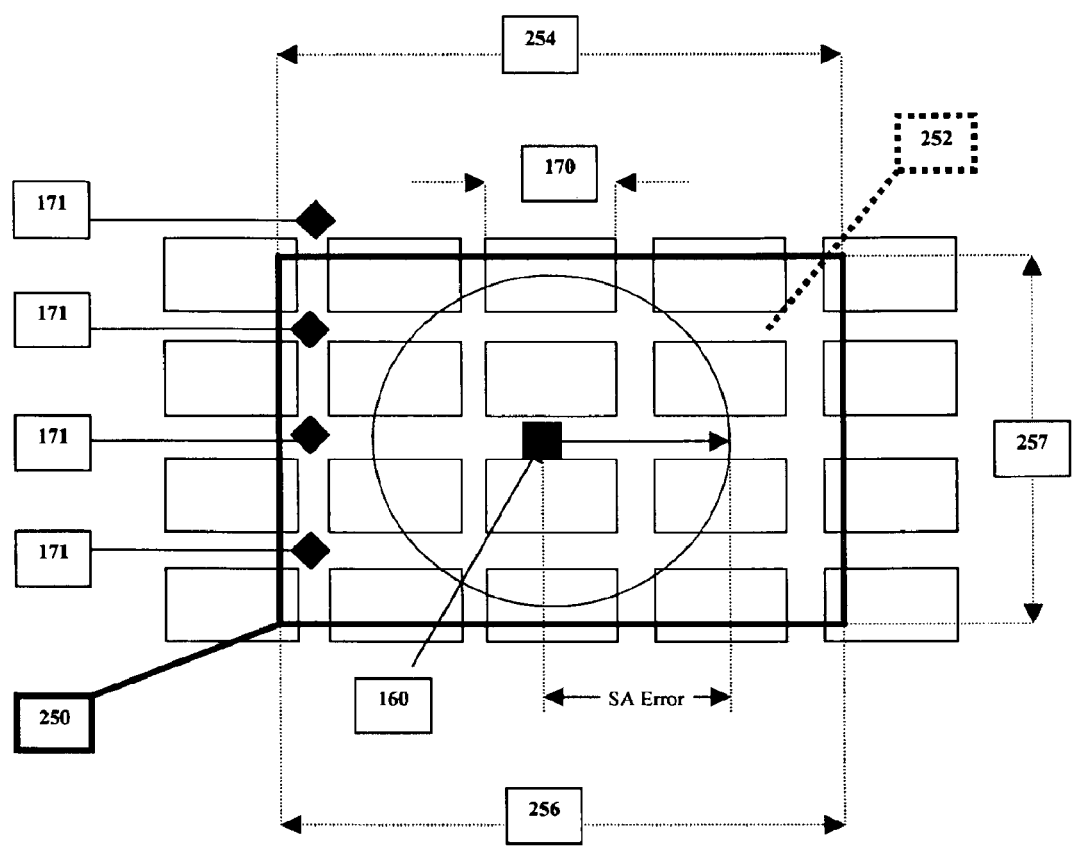

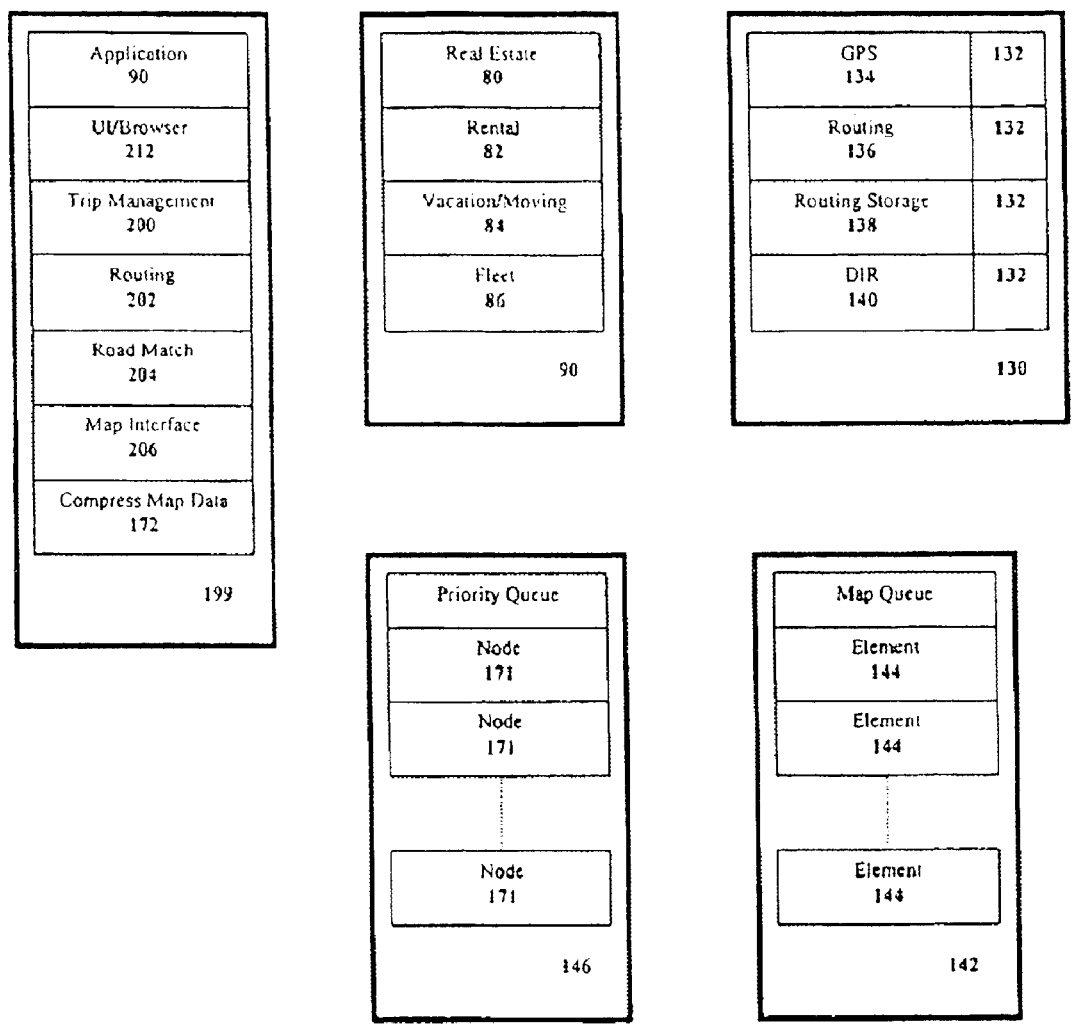
FIG. 7 (Layers of Software & Associated Registers & Queues)

FIG. 8 (Flow Chart of Map Match Process of Road Match Module)
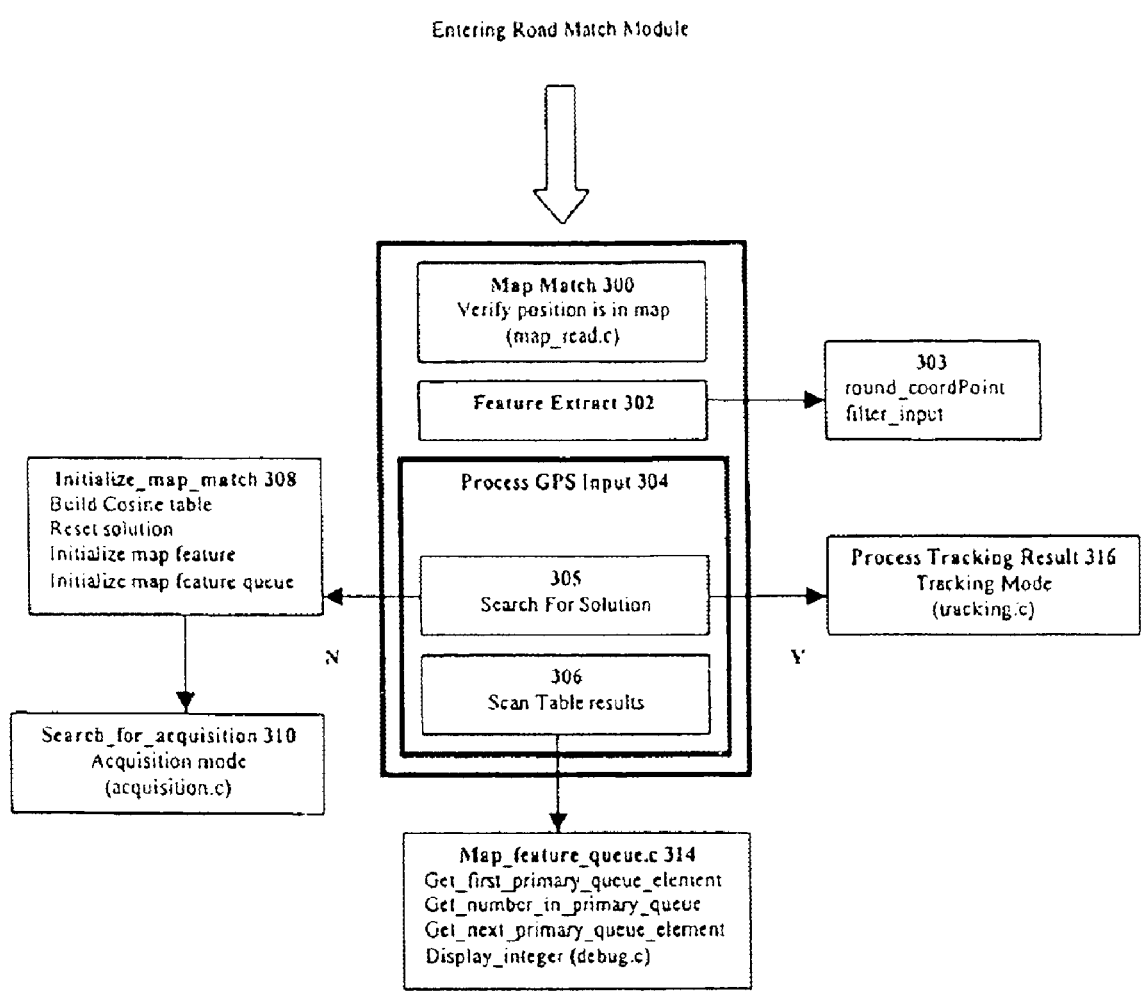

FIGURE 9 (Flow Chart of Tracking Mode Process of Road Match Module)
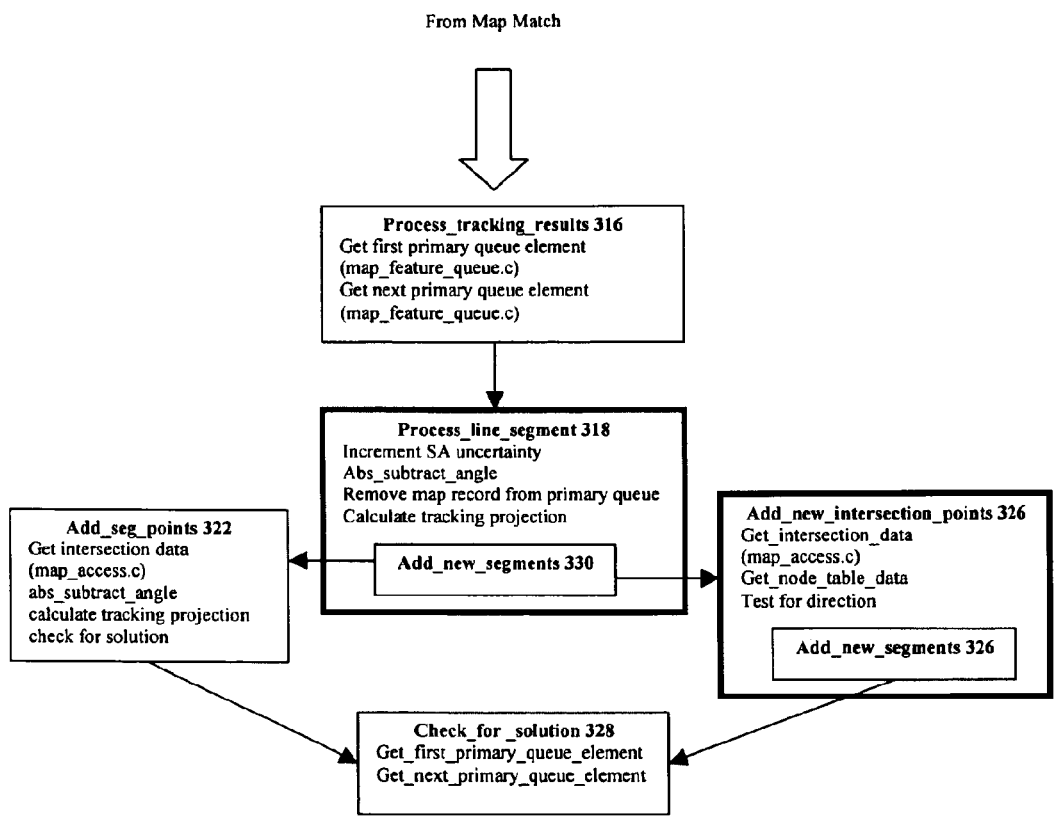

FIGURE 10 (Flow Chart of Acquisition Mode Process of Road Match Module)
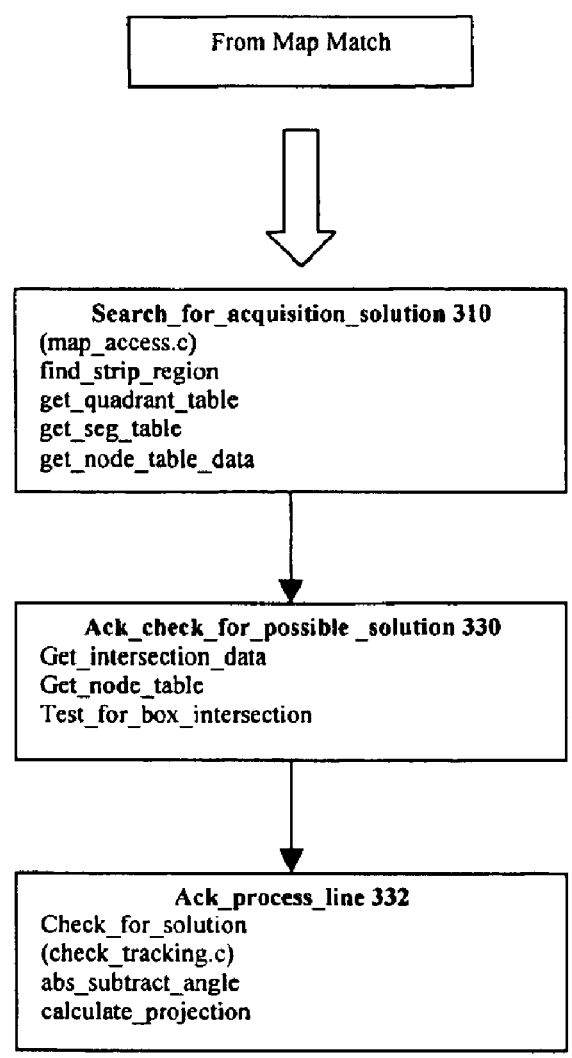

FIG. 11 (Flow Chart of Processes of Trip Management Module)
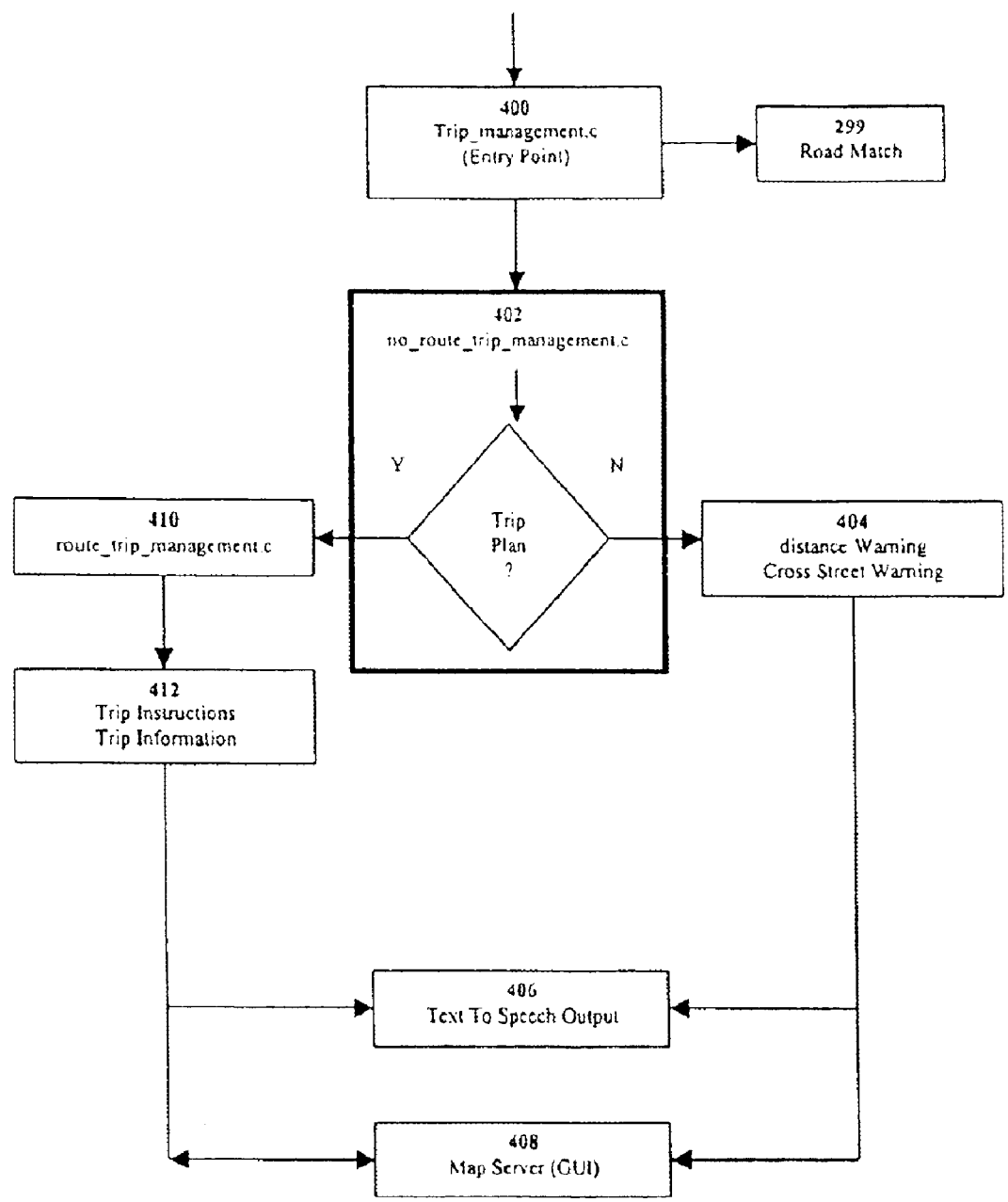

FIG. 12 (Flow Chart of Data Flow of Routing Module)
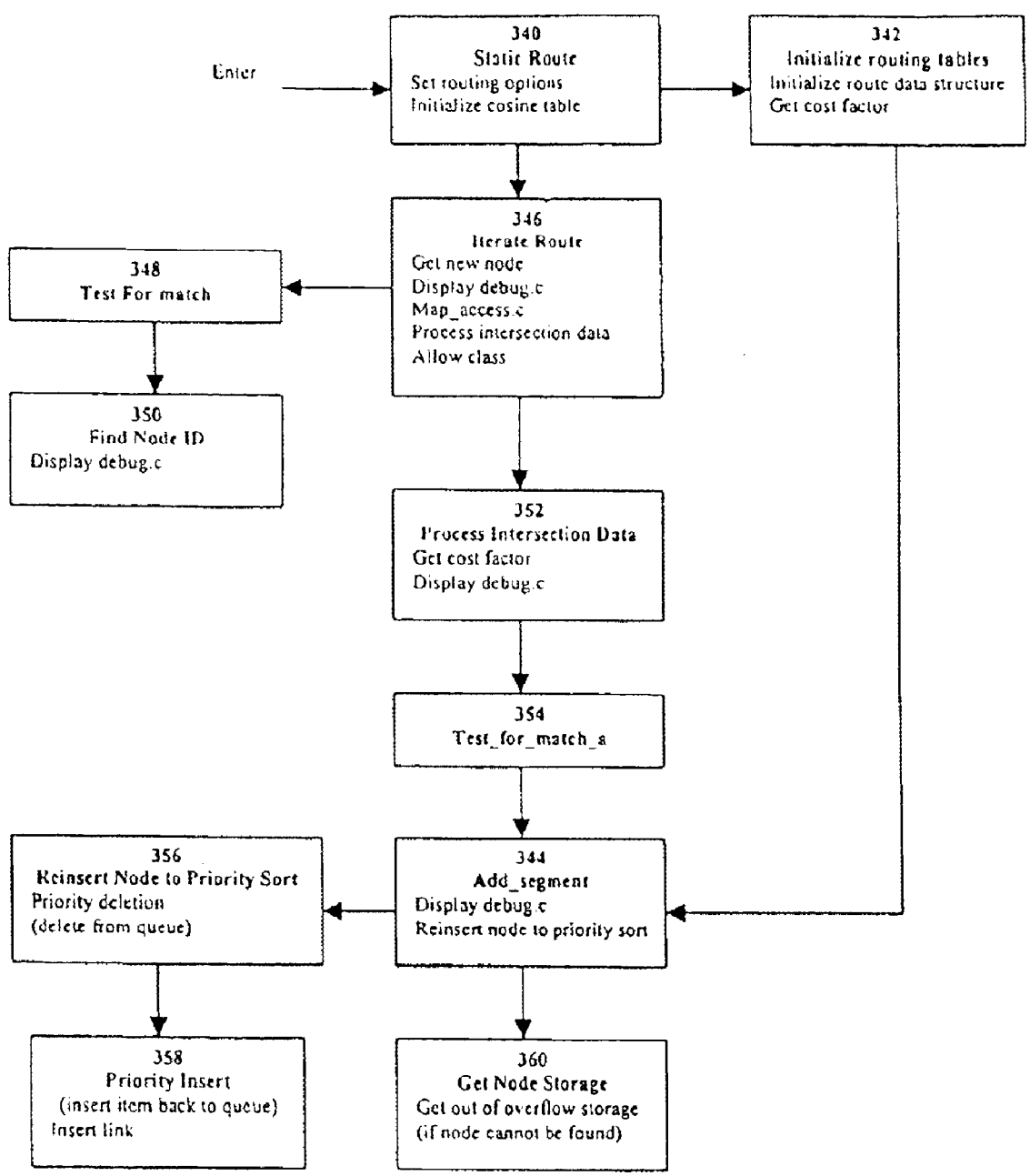

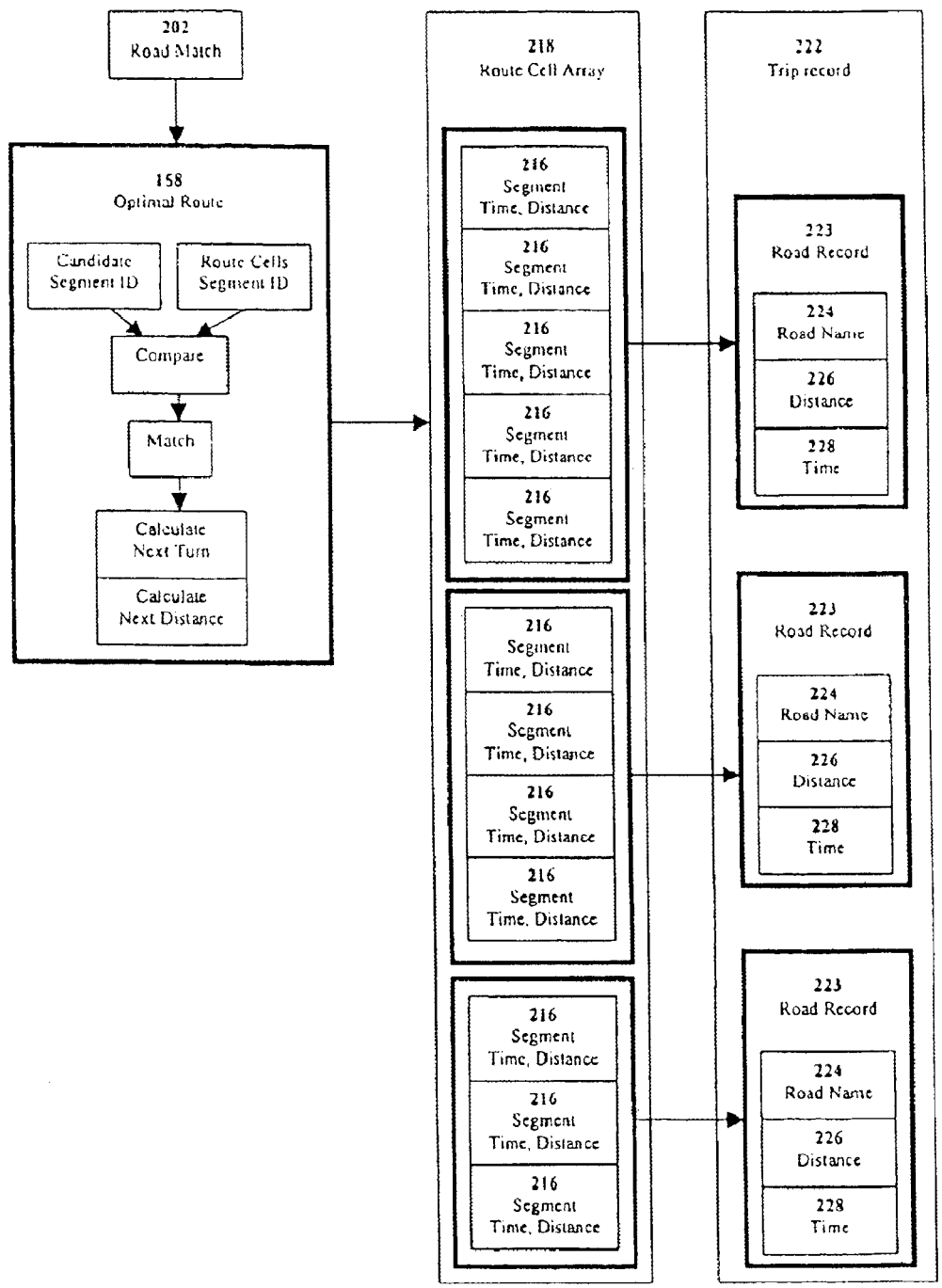
FIG. 13 (Certain Data Structures Used By The Modules of Figure 2)

FIGURE 14 (Initial Routing Process of the Routing Module)
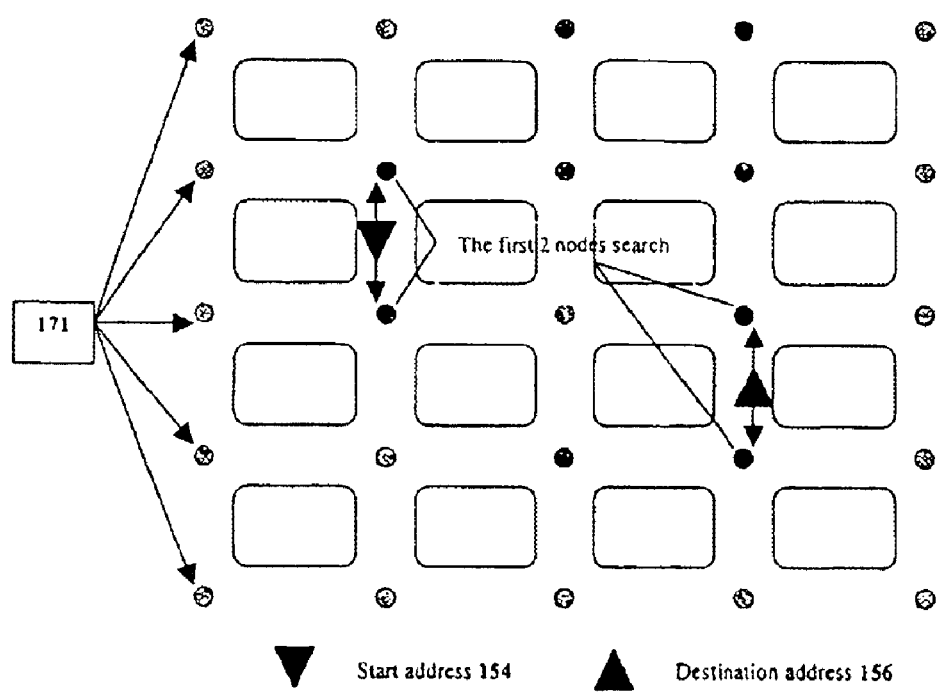

FIG. 15 (Successive Routing Process to the Initial Routing Process)
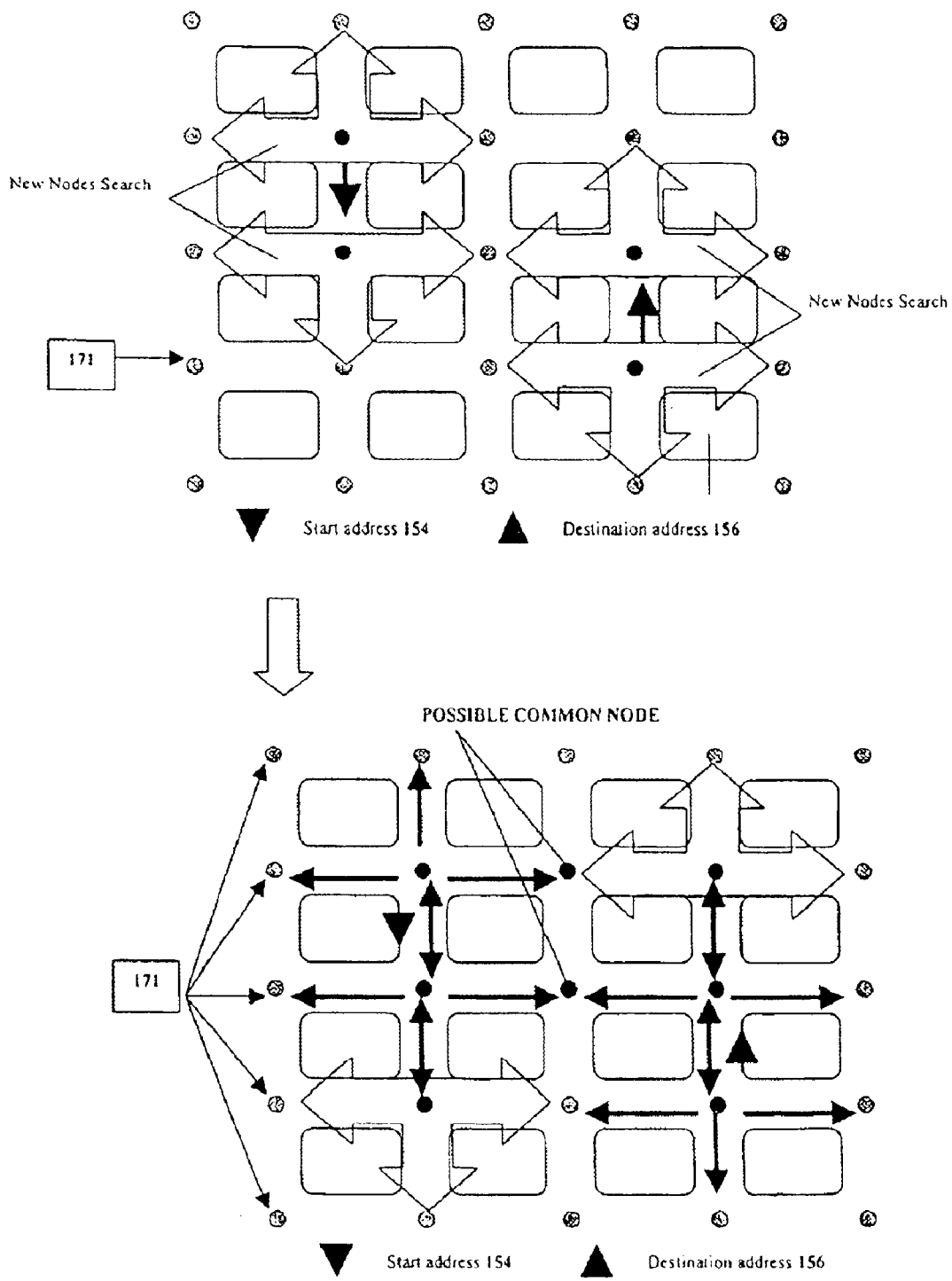

FIG. 16 (Process of a Solution from Among the Routes Calculated by the Processes)
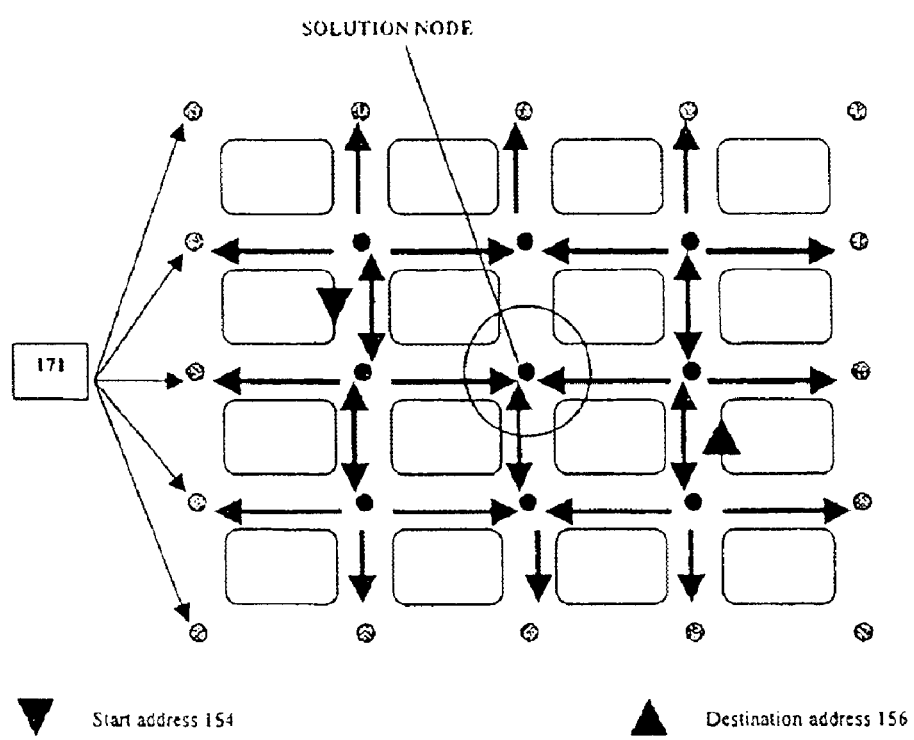
▼ Start address 154     ▲ Destination address 156

FIGURE 17 (Solution Chosen by The Routing Process)
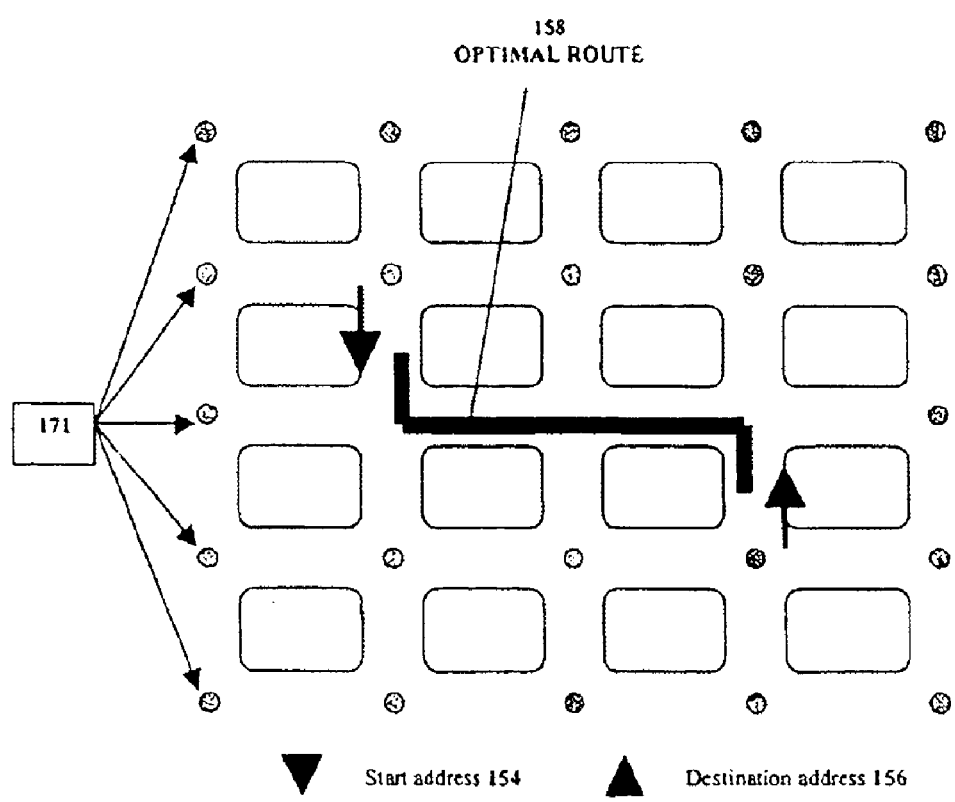

FIGURE 18 (Flow Chart of Some Processes of the Trip Management Module)
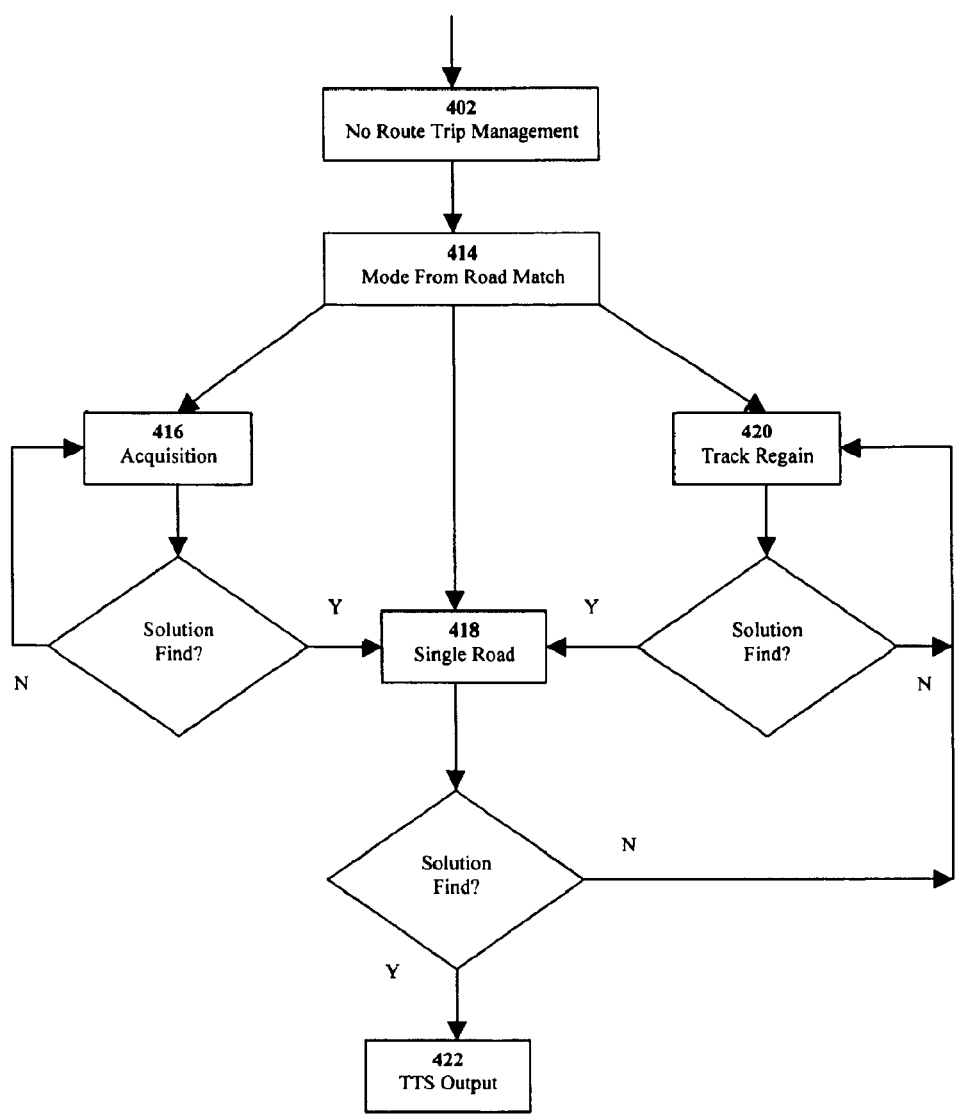

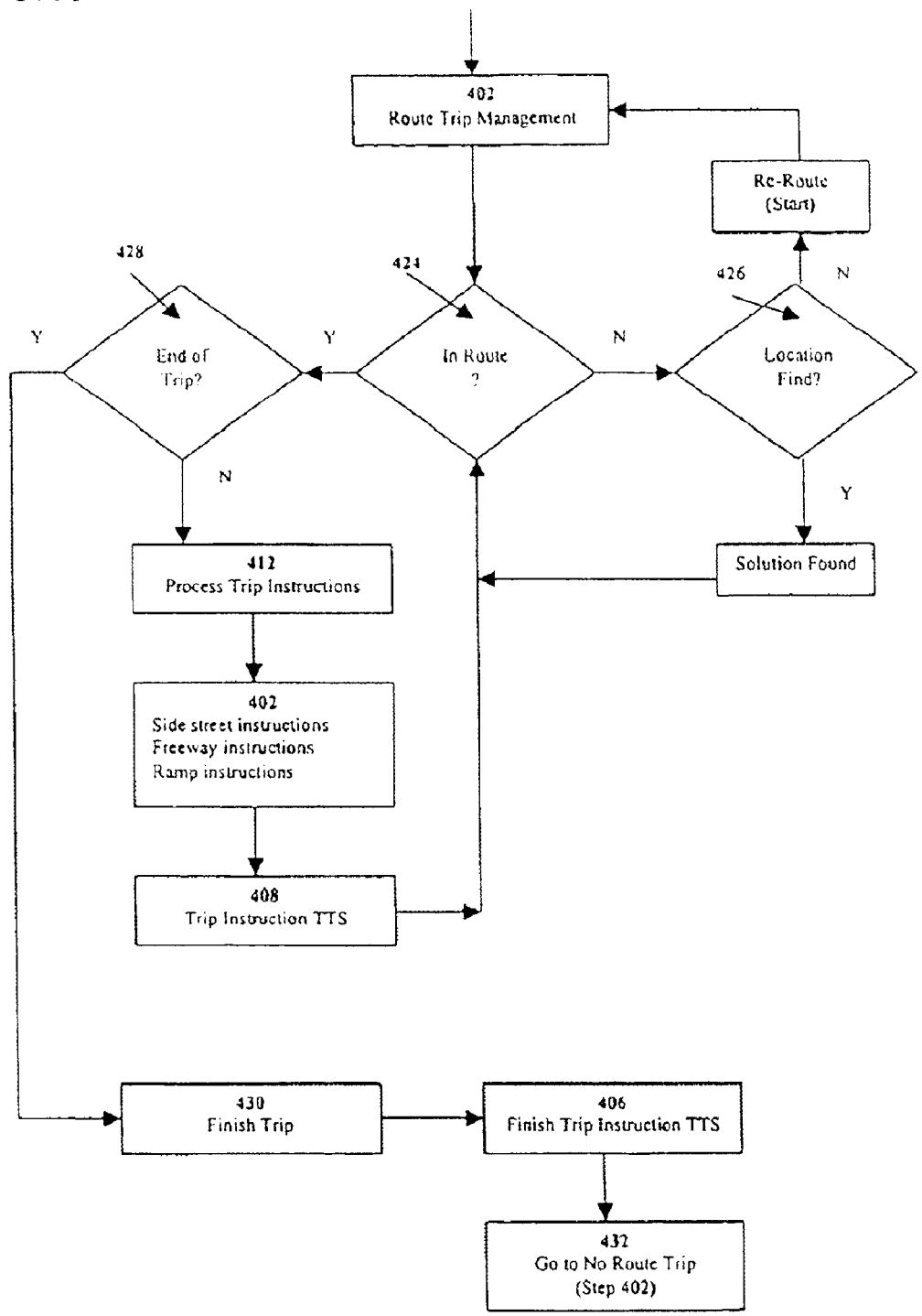
FIG. 19 (Flow Chart of Some Processes of the Trip Management Module)

APPARATUS AND METHOD FOR VEHICLE NAVIGATION

RELATED APPLICATIONS

This application claims the benefit of U.S. Provisional Application No. 60/232,074 filed Sep. 12, 2000.

BACKGROUND OF THE INVENTION

1. Field of the Invention

The present invention relates to a portable navigation system, and more particularly, to a portable vehicle navigation system carried in or removably mounted to a vehicle.

2. Description of the Related Art

One type of conventional vehicle navigation apparatus is mounted on a vehicle and is generally self-contained, except for receiving inputs on vehicle location from a source external to the navigation apparatus. This navigation apparatus typically includes a mass memory storage device, such as a CD-ROM (or equivalent) in which pre-determined map data is stored, a display unit for displaying map information (including the starting, current and ending positions of the vehicle and the route between starting and ending positions), a vehicle position sensing unit such as a GPS receiver for detecting the present position and present direction of a vehicle, and a controller for receiving input from the vehicle position sensing unit and the mass memory storage device and calculating the optimal route to the ending position from the starting position and from the present position.

In operation, the apparatus reads out map data containing the present position of the vehicle from the mass memory storage device, draws a map image including the vehicle position at the center thereof based on the map data, displays the map image on a display screen, and fixes a vehicle position mark (location cursor) at the center of the display screen. This indicates where the vehicle is located at present to the driver, at a glance, by scrolling map images on the screen depending upon the movement of the vehicle, or by moving the vehicle position mark while fixing the map image on the screen. Maps stored in mass memory storage device are divided into longitudes and latitudes each having a suitable width in accordance with a scale (e.g. 1/12,500, 1/25,000, 1/50,000, 1/100,000); roads are displayed by a set of coordinates of nodes represented by the longitudes and latitudes. A road is composed of two or more nodes connected to each other, and a road portion connecting two nodes is called a link. The map data is composed of (1) a road list, a node table, a node list constituting crossings, a map matching consisting of a crossing network list, and a route searching road layer; (2) a background layer for displaying roads, buildings, facilities, parks, rivers and the like on a map screen; and (3) a character/symbol layer for displaying the characters, map symbols and names of administrative districts such as names of cities, towns and villages, names of roads, names of crossings (road junctions) and names of buildings. The navigation apparatus is provided with a route guiding function, thereby allowing the driver to easily travel toward a desired destination without losing his way. The route guiding function automatically searches for a nearest route connecting a starting location to a destination by carrying out a simulation using map data, and stores the result of the simulation as guided route data, wherein the driver can simply understand an optimum route to his destination as follows.

Another type of conventional vehicle navigation apparatus is similar to the first type, except it but relies on access to external sources to receive updates of maps and/or for calculations of optimal routes. This navigation apparatus typically includes a wireless communication device, such as a cellular or PCS telephone, for downloading map data from an external source of map data and communicating with an external computing system for determining optimal route from desired starting and destination locations, a memory storage device, such as RAM (or equivalent) in which is stored map data downloaded from the external source, a display unit for displaying map information (including the starting, current and ending positions of the vehicle and the route between starting and ending positions) and a vehicle position sensing unit such as a GPS receiver for detecting the present position and present direction of a vehicle. In operation, this apparatus functions substantially similar to the previously described self contained apparatus, except that the map data is downloaded from the external source and the route guiding function is performed by the external computing system.

Digital map distributions are targeted to a wide market and are concerned with the collection of data, not the use of it. They are distributed mostly in a text format—universal, but large—and most of the time contain many more data sets than the application requires. So a conversion process is always required to distill out the target data. This is illustrated by the fact that every database comes with a conversion utility. This process usually accounts for the largest unanticipated time requirement.

While the present navigation apparatuses are generally adequate, there is a need for a portable version of the same, so that one navigation apparatus can be readily used in more than one vehicle. There is also a need for a portable navigation apparatus that makes use of a mass storage device other than CD-ROMs or similar devices that contribute to relatively large form factors and relatively large power consumption. There is also a need for such a device having an improved map that more readily allows the position determined by the position-sensing device to be correlated with a position on the stored map. There is also a need for such a device having a means of conveying route information to a driver by voice rather than a display.

SUMMARY

According to the present invention, the above problems are solved by a portable vehicle navigation aide device capable of conveying traveling instructions to a user in possession of the device to allow the user to navigate from a predetermined source position on a predetermined road map, containing road information, to a predetermined destination position on the map, along an optimal road route, under control of travel instructions spoken by the device. Preferably the device includes a position sensor for sensing position of the device and reporting that position, a text to speech converter, a sound conveying device (such as a speaker and associated amplifier) operably connected to the text to speech converter for conveying speech to the user. The device further includes memory for storing a predetermined road map containing road information and a controller. The controller is operably connected to the position sensor, text to speech converter and map memory. The controller calculates an optimal road route between the source position and the destination position, generates a series of text road travel instructions that describe the optimal route in terms of associated road information, receives the report of position by the position sensor during travel, calculates the speed of the device and its direction of travel from the positions reported by the position sensor and determines the road map position corresponding to the reported position based on the position reported, the calculated speed, the calculated direction of travel and the road information. The controller also conveys the series of text road instructions to the text to speech converter. Based on the road map position determined, the controller causes the text to speech converter to convey to the sound conveying device each of the series of text road instructions at a time before the travel has reached the map position corresponding to the particular text road instruction such that the user hears relevant road travel instructions in substantially a timely manner. The controller compares the determined road map position to the optimal road route to determine if the actual travel route is deviating from the optimal route, calculates an optimal correction road route between the determined road map position and a position on the optimal road route, then generates a series of text road travel instructions that describe the optimal correction road route. The controller conveys the series of text road travel instructions that describe the optimal correction road route to the text to speech converter, and based on the road map position determined, causes the text to speech converter to convey to the sound conveying device each of the series of correction road route text road instructions at a time before the travel has reached the map position corresponding to the particular correction road route text road instruction.

According to another aspect of the present invention, the controller of the navigation aide device determines the source position, prior to travel, by receiving the report of position by the position sensor before travel and determining, as the source position, the road map position corresponding to the reported position based on the position reported and the road information.

According to another aspect of the present invention, the navigation aide device is capable of being carried within a vehicle and the sound conveying device includes an interface suitable for being connected to the input of a sound system of a vehicle. This allows the controller to control the sound conveying device such that road travel instructions being conveyed to the user are conveyed to the user via the sound system interface.

According to another aspect of the present invention, the controller calculates an optimal road route between the source position and the destination position by first calculating an optimal road route between the source position and one or more first arbitrary positions and calculating an optimal road route between the destination position and one or more second arbitrary positions. The controller then determines one or more matches between first arbitrary positions and second arbitrary positions. Finally, the controller determines the optimal road route from among the matches between first and second arbitrary positions.

According to a final aspect of the present invention, the navigation aide device is used in association with a predetermined application. The predetermined road map contains road information that is a subset of all the road information available, with the subset being chosen based on its relevance to the predetermined application.

BRIEF DESCRIPTION OF THE DRAWINGS

FIG. 5 is a block diagram of multiple devices of FIG. 1 operating in the preferred client/server mode and illustrating device one as having both integral and attached PDAs and/or cell phones.

FIG. 6 is a pictorial representation of the box search structure used by the acquisition and track modes of the road matching software module of FIG. 2.

FIG. 7 depicts the layers of software and associated registers and queues that run on device 1 of FIGS. 1 and 2.

FIG. 8 is a flow chart of the map match process of the road matching module of FIG. 2.

FIG. 9 is a flow chart of the tracking mode process of the road matching module of FIG. 2.

FIG. 10 is a flow chart of the acquisition mode process of the road matching module of FIG. 2.

FIG. 11 is a flow chart of some of the processes of the trip management module of FIG. 2.

FIG. 12 is a flow chart of the data flow of the routing module of FIG. 2.

FIG. 13 is a pictorial depiction of certain of the data structures used by the modules of FIG. 2.

FIG. 14 is a pictorial representation of the initial routing process of the routing module of FIG. 2.

FIG. 15 is a pictorial representation of successive routing process to the initial routing process of FIG. 14, depicting node searches from both the source (origin) and destination addresses.

FIG. 16 is a pictorial representation of the process of a solution from among the routes calculated by the processes in FIG. 15.

FIG. 17 is a pictorial representation of the solution chosen by the process illustrated in FIG. 16.

FIG. 18 is a flow chart of some of the processes of the trip management module of FIG. 2.

FIG. 19 is a flow chart of some of the processes of the trip management module of FIG. 2

DESCRIPTION OF PREFERRED
EMBODIMENTS OVERVIEW

Figure 1:
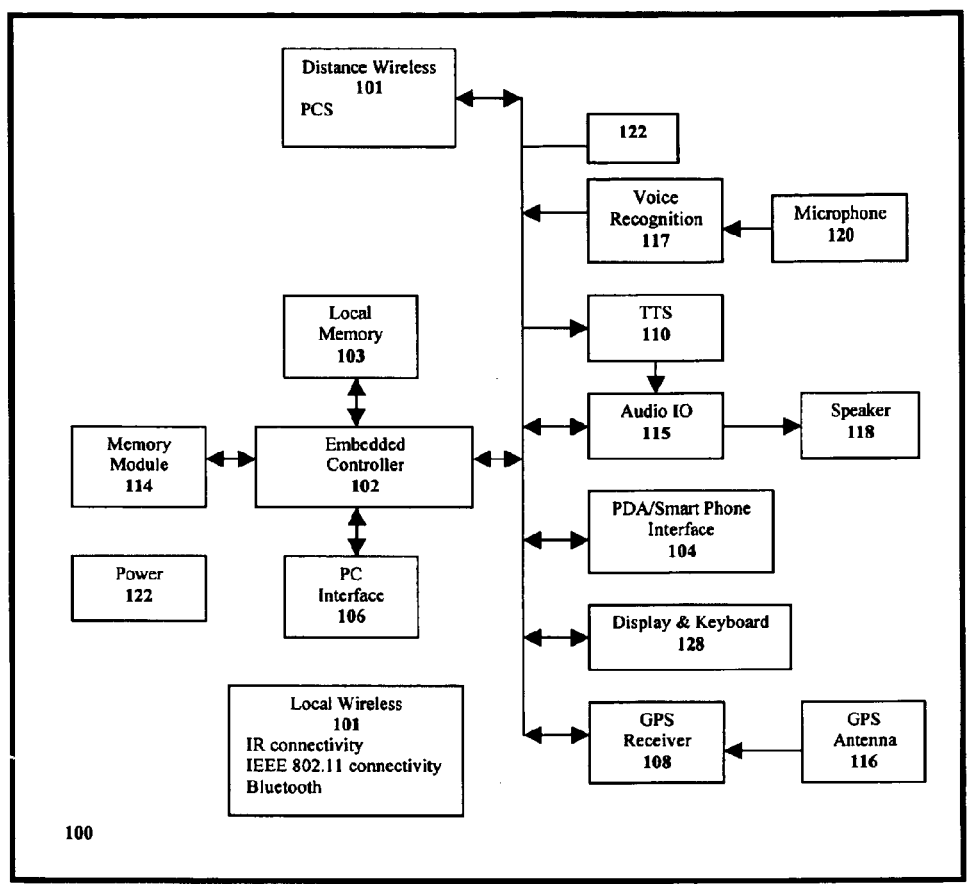
FIG. 1 is a system block diagram of the hardware of a first preferred embodiment of the portable navigation device of the present invention.
Figure 2:
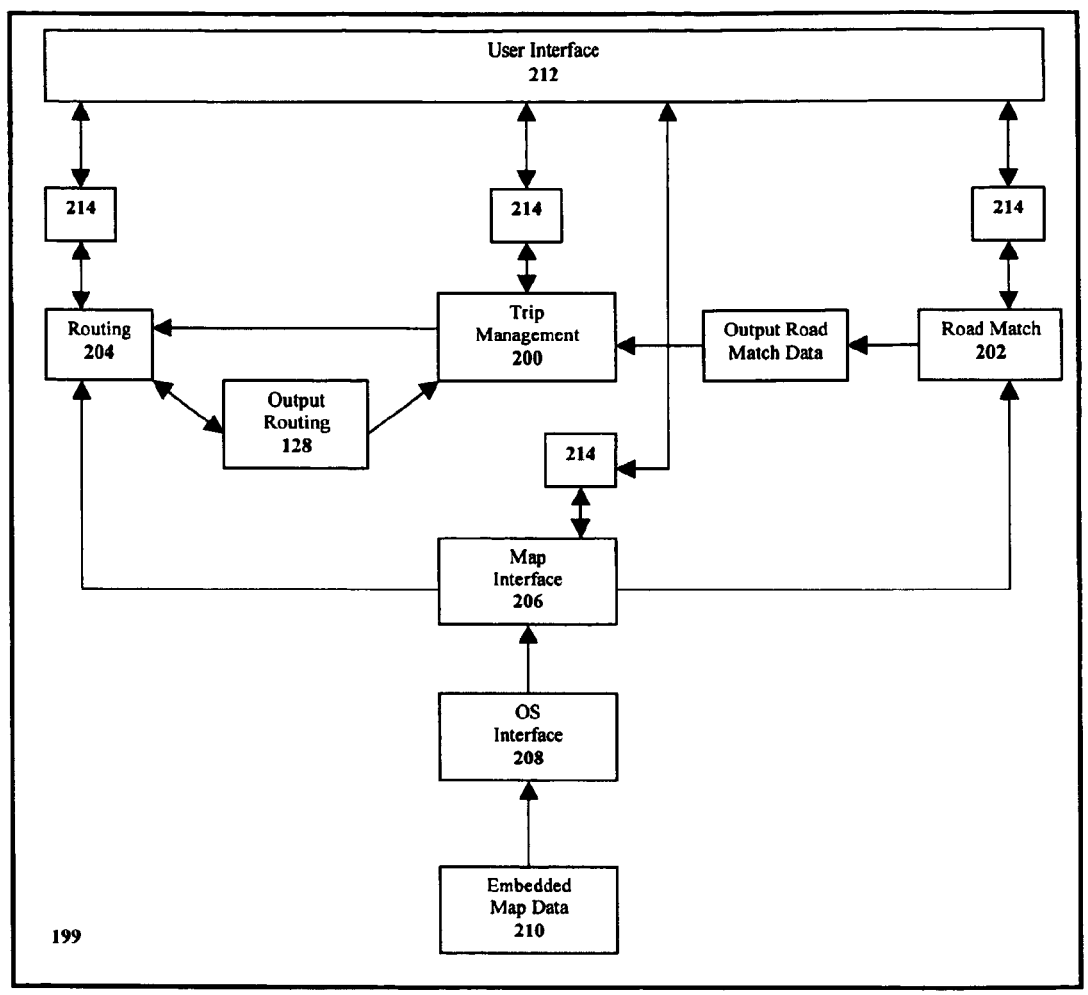
FIG. 2 is a system block diagram of the software modules contained in the device of FIG. 1.
Figure 3:
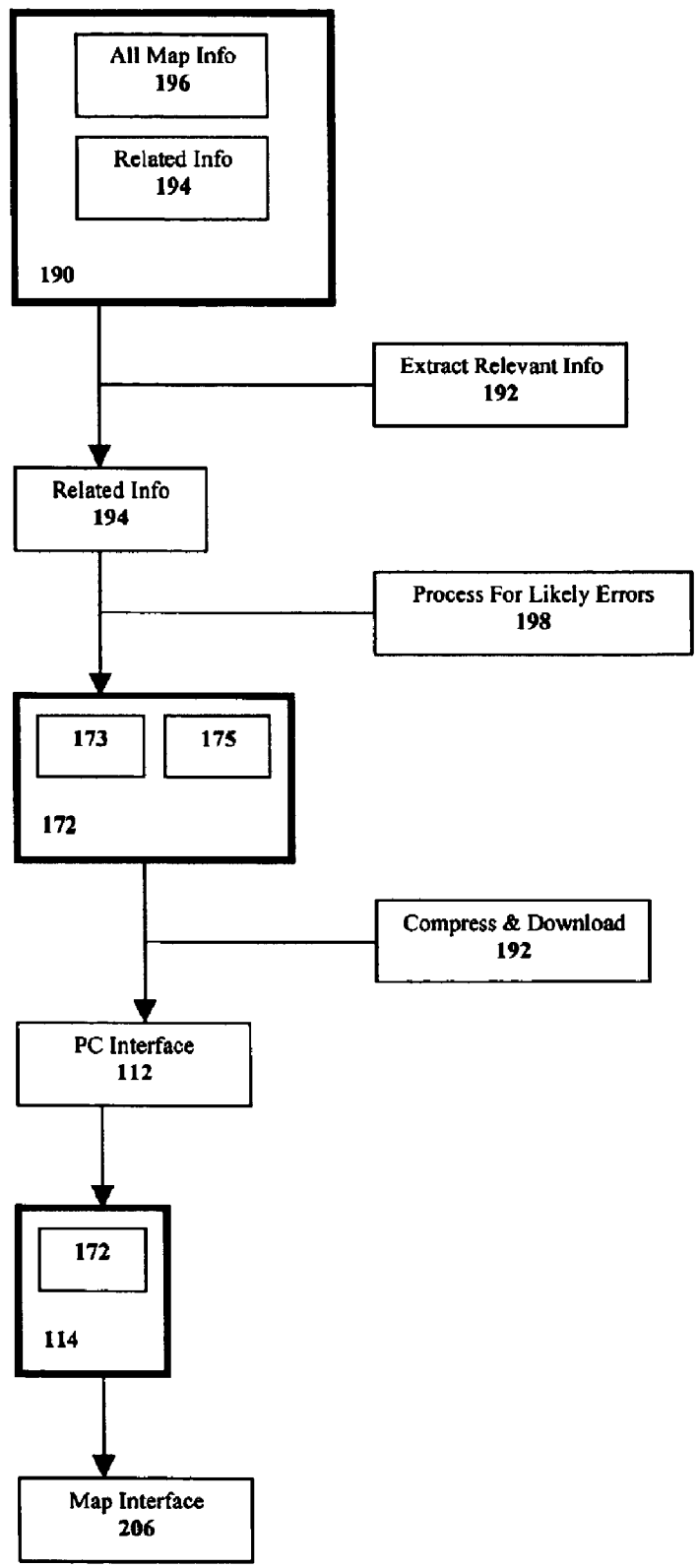
FIG. 3 is a pictorial representation of the process of creating the map data stored in the device of FIG. 1.
Figure 4:
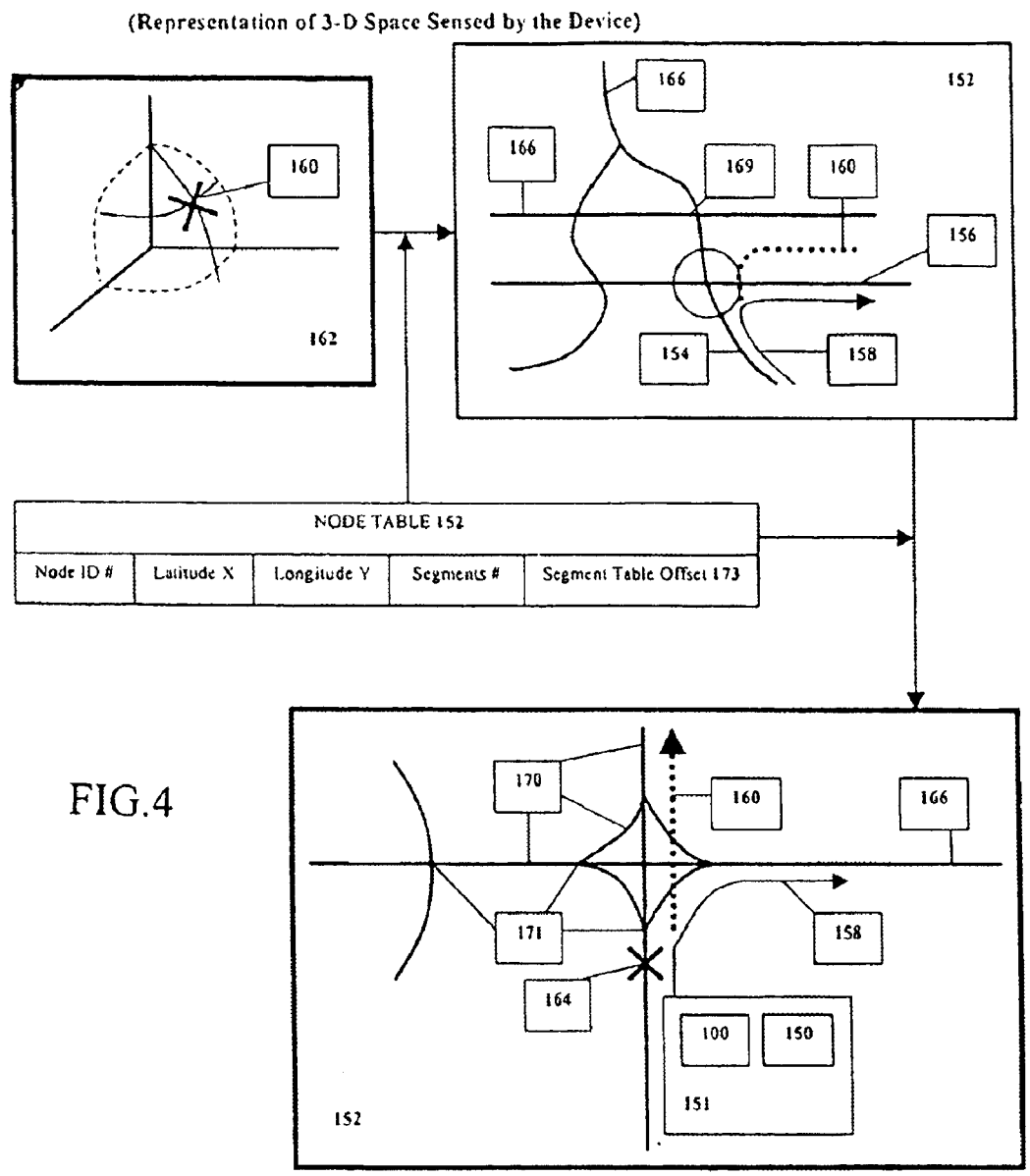
FIG. 4 is a pictorial representation of 3D space sensed by the device of FIG. 1, the map space stored in the device of FIG. 1, the correspondence between these two spaces and the data structures used to store data describing the map space.

Referring now to FIGS. 1 through 7, in FIG. 1 there is shown a system block diagram of a first preferred embodiment of the portable navigation device 100 of the present invention. FIG. 2 depicts the main software modules 199 that run on device 100. Navigation device 100 provides a user (not shown) with navigation aids useful in planning and following a route 158 along a transportation pathway 152, such as a road system. These aides include routing, route planning and road matching. As shown in FIG. 4, the most basic application of these navigation aides is to enable the user to travel from a source address 154 to a destination address 156 along an optimal route 158 computed by device 100. While these navigation aides are useful in and of themselves, their usefulness becomes much greater in combination with specific application contexts 90, such as in Real Estate 80, Rental Car 82, Vacation/Moving 84 and Fleet Routing 86. These specific applications 90 will be described in greater detail once the basic operation of device 100 has been described.

As the user (and the accompanying device 100) travels, the position of her vehicle 150 in real space 162 is periodically determined by device 100. This position 160 in real space 162 is periodically conveyed to the user along with instructions on where to drive the vehicle 150 to follow the route 158 (e.g., turn right up ahead at the intersection of Hollywood and Vine). While these commands could be conveyed to the user as text or symbols on a display 128, preferably device 100 communicates them to the user using the spoken word. This allows the user to watch the road or monitor the vehicle's 150 other instruments (not shown) while driving instead of looking at a display 128.

Navigation device 100 is intended to be portable, so a user can use device 100 "on foot," or can readily transfer device 100 among different vehicles 150. Preferably device 100 has the form factor of a Personal Digital Assistant, or PDA, like the Handspring Visor™. Device 100 can be configured as a stand-alone unit or as an attachment to another suitable device 105. Configured as an attachment, device 100 can make use of the hardware, features and functions of the other devices 105 (like the Handspring Visor™ PDA 107), reducing the need of device 100 to provide that hardware, features and functions itself. Suitable devices 105 include PDA 107 and cellular or PCS wireless handset 109. These devices 105 provide navigation device 100 with use of certain of its hardware capabilities, including its input/output hardware, such as its keyboard, LCD display, speakers, microphone or memory, and any wireless connections, such as PCS or cellular capability, IR transmitter/receiver, and local wireless connections, such as Bluetooth or 802.11 (not shown). In addition, device 100 can use the software or databases, such as an address database 91 of a PDA 107, in one or more applications 92, or could even run applications 199 on the processor (not shown) of the PDA 107.

In one preferred embodiment, device 100 contains and uses a static map 172. That is, map 172 is not updated during travel of route 158. In another preferred embodiment, device 100 uses a dynamic map 172. That is, during travel of route 158, map 172 is updated (e.g., via wireless link 101 from server 180 that stores and transmits to device 100 updated map information 176) to reflect changing conditions affecting travel along route 158, such as a change in weather, traffic congestion and road construction not reflected in previous downloads of map 172 to device 100. Preferably updated map information 176 includes only the changes to map 172, to reduce the amount of information that needs to be transmitted. In response to updated map information 176, device 100 may recalculate the optimal route 158 and inform the user of the new route 159.

Referring now to FIGS. 1, 2 and 7, the main software modules 199 include modules designed to specifically implement the navigation aides (Trip Management 200, Road Matching 202, and Routing 204), as well as Map Interface 206, Operating System Interface 208, Embedded Map 210, User Interface 212 and User Applications 90. User Applications 90 access the other software modules 199 via Application Programming Interface (API) Entry Points 214.

In brief, Routing module 204 constructs an optimal route 158 along road system 152 between a source address 154 and a destination address 156. Road Matching Module 202 translates from the position 160 of vehicle 150 in real space 162 to its position 164 on map 172 and also determines and reports the direction of travel. The Trip Management Module 200 ties together the information generated by the other modules 199 in device 100 to produce directions to the user. As its name implies, the User Interface module 212 allows inputs and outputs between device 100 and the user. Trip Management Module 200 also conveys to the user trip information specified by any User Application 90 (such as the location of gas stations and restaurants).

Device Hardware

Referring now to FIGS. 1 through 6, FIG. 1 depicts the basic hardware subsystems of device 100. These include Embedded Controller 102 for controlling the operation of device 100, PDA/Smart Phone Interface 104, PC Interface 106, Position Sensor 108, such as GPS Receiver 111 (which includes GPS antenna 116), Text to Speech (TTS) Converter 110, audio input/output device 115 and voice recognition device 117. Preferably navigation device 105 further includes local wireless device 103 (such as an IR transmitter/receiver, an EEE 802.11 compliant transmitter/receiver or a Bluetooth™ transmitter/receiver), distance wireless device 101 (such as a PCS or cell phone or other voice/data wireless transmission system well know to one skilled in the art). These components are interconnected via one or more system buses 112.

Preferably navigation device 100 further includes a speaker 118 and a microphone 120 connected to and powered by audio input/output device 115. Preferably audio device 115 includes an amplifier and a preamplifier (not shown) to drive speaker 118 and microphone 120, respectively. Speaker 118 can be integral with device 100, or an earphone (not shown), or a speaker associated with a sound system 151 in vehicle 150 (with sound system 151 configured to mute any other programming, such as music, while device 100 uses its voice recognition and text to speech features to communicate with the user via vehicle sound system 151), connected to device 100 via local wireless interface 103 or other suitable short range wired or wireless connection system.

Preferably while following a route 158 in vehicle 150, a user communicates to device 100 via its non-visual communication features, such as voice recognition 117 and TTS Converter 110. TTS Converter 110 and voice recognition 117 operate together to allow controller 102 to receive and impart information, respectively, via speech. Voice recognition 117 and/or TTS Conversion 110 can be accomplished in dedicated hardware, or in software running on controller 102 or on an external device, such as a PDA 107.

Navigation Device 100 further includes Memory Module 114 connected to Controller 102 via bus 112. Preferably Memory Module 114 consists of Compact Flash Memory (e.g., Sony Memory Stick™) or a relatively small hard disk drive. Memory Module 114 is designed to hold navigation data 170, describing road system 152, in compressed form of a map 172. Navigation data 168 can be entered into navigation device 100 in a number of ways. Data 168 can be downloaded into memory 114 via PC Interface 106 or PDA/Smart Phone Interface 104. PC Interface 106 allows data 168 and applications 90 to be exchanged between device 100 and a personal computer (not shown). Suitable PC Interfaces 106 include any standard computer interface, including a standard personal computer serial or parallel interface, a Universal Serial Bus (USB).

Alternatively, Memory Module 114 can be removed from device 100 and programmed with map 172 or applications 90 via a separate interface (not shown) by a computer, PDA, Smart Phone (not shown) or other suitable conduit.

Power for Navigation Device 100 can be provided by any suitable power supply 122, such as a battery, a Cigarette Lighter Adapter (for converting the +12V DC power typically available in an automotive vehicle into a form more suitable for use by device 100) or an AC/DC Converter (for converting line current to suitable DC current).

As shown in FIGS. 1 and 5, device 100 may be attached to other devices 105, such as a PDA 107 or a cellular or PCS wireless phone 109, to make use of the hardware, software and/or databases of these devices 105. This attachment may be temporary, with the connection between device 100 and 105 made via a disconnectable interface 104. This approach allows navigation device 100 to take advantage of the hardware, software and/or databases of separate devices 105, and to be interchangeably connected to a variety of device 105. Alternatively, the device 105 is made integral to navigation device 100.

When connected to a device 105, navigation device 100 can use hardware features of device 105 such as its display, keyboard or wireless connection 182 to an external server or telecommunications system 180. An application 90 resident on device 100 can also make use of any addresses stored in device 105 to populate a menu of starting and destination addresses 154 and 156.

Preferably position sensor 108 is a GPS system 111. Alternatively, Position Sensor 108 can consist of another type of position location device, such as one based on triangulation of signals from cell phone towers (not shown) to cell phone 109 or a wireless broadcast of a location identifier.

Software Modules: Overview

Referring now to FIGS. 1–7, the Trip Management Module 200 ties together the information generated by the other modules 199 in device 100 in order to produce what is generally thought of as "road navigation." It is this process that will guide the vehicle 150 to the destination address 156. Proper navigation requires that an optimal route 158 be determined before traveling, and that the route 158 is actually followed during the trip. Thus preferably before beginning a trip, Trip Management Module 200 calls Routing Module 204 to generate the optimal route 158. At the option of the user, Routing Module 204 can optimize route 158 for shortest time or most convenient driving (e.g., mostly interstate or mostly local roads). Routing Module 204 describes route 158 as elements 169 on map 172. Typical elements 169 include road segments 170 (e.g., segments of road between particular features, such as curves, intersections or towns), bearings, turn events (both road direction change and change to other segments), and distances to travel on each segment 170.

During the trip, the Road Matching Module 202 determines the position of the vehicle 150 on map 172 using GPS position 160, map 172 and information 174 (stored in controller 102 or memory 114) on the history of the trip. The stored history information 174 allows Road Matching Module 202 to compare expected travel through the map segments 170 along route 158 to what actually happens. By comparing each event with its actual occurrence, Road Matching Module 202 can correct for small errors in either GPS position 160 or rendering of map 172.

In summary, a main duty of Trip Manager Module 200 is to monitor the progress of the trip as given by the Routing Module 204, and confirmed by Road Matching Module 202. Trip Manager Module 200 must detect when a successful transition of each segment 170 or other element 169 has been made, and to display the next driving direction from the list of such instructions generated by Routing Module 204, taking into account time and speed so that any warnings are not given too early or too late. Trip Manager Module 200 must also detect deviation from the route 158, and upon doing so, reroute by ordering Routing Module 204 to generate a new route 159 back to the original route 158 in an efficient manner.

Trip Manager Module 200 may also filter road segment 170 or other elements 169 in route 158 so that the driver is spared communication of unnecessary details contained by the actual Map 172.

Details of the Road Matching Module

Referring now to FIGS. 1 through 10, Road Matching Module 202 translates the reported GPS position 160 to the current position 164 and direction of travel of vehicle 150 on map 172. The inputs to this module 202 are GPS position 160, direction, and speed. The format of GPS position 160 used is the RMC (Recommended Minimum Specific GPS Data). This message contains time, date, position, course, and speed data. Even if the GPS receiver 111 is not navigating, the GPS receiver 111 will still receive information and output these messages every second. The following is a table of the format of the GPS message (a sample message is 5,02812,A,3254.701,N,11710.507,W,000,119, 300799,13.8, E,*55,<CR><LF>):

| Field No. | Symbol: | Field Description | Field Type | Example |
|---|---|---|---|---|
| 0 | $_RMC | Index | | 5 |
| 1 | POS_UTC | UTC of position (hours, minutes, seconds, decimal seconds | hhmmss.ss | 002812 |
| 2 | POS_STAT | Position status A = valid data V = Data invalid | a | A |
| 3 | LAT | Latitude | xxxx.xx | 3254.701 |
| 4 | LAT_REF | Latitude direction (N, S) | a | N |
| 5 | LON | Longitude | xxxx.xx | 11710.507 |
| 6 | LON_REF | Longitude direction (E, W) | a | W |
| 7 | SPD | Speed over ground (knots) | x.x | 000 |
| 8 | HDG | Heading/track (degrees True) | x.x | 119 |
| 9 | DATE | Date (dd/mm/yy) | xxxxxx | 300799 |
| 10 | MAG_VAR | Magnetic variation (degrees) | x.x | 13.8 |
| 11 | MAG_REF | magnetic variation (E, W) | a | E |
| | CKSUM | Checksum | *hh | *55 |
| | <CR><LF> | Sentence terminator | | <CR><LF> |

The Road Matching Module 202 uses the Map 172 to match GPS position 160 to map position 164. For each map position 164 determined, Road Matching Module 202 outputs its associated block number, segment, name, and distance to the next intersection to Trip Management Module 200 or other calling application 90. The name of the approaching cross street 166 is reported as well.

In an ideal world, road matching would be trivial or unnecessary. However, due to a number of error sources (e.g., GPS multipath errors, accuracy of map 172 and the Situational Awareness error built into any GPS position 160), the map position 164 and the GPS position 160 often do not coincide. It is therefore the important task of Road Matching Module 202 to determine which road 166 best fits the currently available data.

Road Matching Module 202 operates in two modes, Acquisition Mode and Tracking Mode. In Acquisition Mode, Road Matching Module 202 locates all roads 166 (or more specifically, all road segments 170) nearest the reported position 160 and examines the suitability of the match for corresponding map position 164, especially looking for roads 166 whose bearing matches the current direction of travel. In Tracking Mode, the currently matched road 166 associated with the nearby road segments 170 is "followed." Map 172 topology dictates where turns are permitted. Changes in direction (curves) are also observed, and anytime one of these features is traversed, Road Matching Module 202 will identify it and automatically correct the current map position 164.

Note that Tracking Mode operates faster then Acquisition Mode because fewer road segments 170 need to be examined. It is also more robust because the map 172 topology "checks" the calculated route 158.

Road Matching Module 202 also stores a limited history 174 of road segments 170 traversed. Preferably history 174 includes for each road segment 170 and/or road 166 its name and an in and out time stamp. Trip Management Module 200 or other application 90 can query the Road Matching Module 202 and receive a list of such information from history 174One application 90 might use this history 174 in conjunction with the know length of road segments 170 to compute mileage for expense reports.

Referring now to FIGS. 1 through 10, the operation of Road Matching Module 202 will be described in greater detail. As shown in FIG. 8, first in step 300 Road Matching Module 202 verifies that the current GPS position 160 is in the current map 172. Next in step 302 the relevant features are extracted from map 172, which as shown in step 303 involves rounding coordinates and filtering map information not relevant to the route 158 for the particular application 90. Next, in step 304 the GPS Record 134 (shown in FIG. 7) from the GPS device 111 is processed. In particular, such processing involves in step 305 searching for a road match solutions, which requires in step 306 scanning the map feature queue 142. As shown in more detail in "exploded" step 314, "scanning the map feature queue 142 involves getting the relevant number in the first primary queue element 144, then any successive numbers in successive primary queue elements 144.

If in step 305 no solutions are found queued in map feature queue 142, Module 202 will run in Acquisition Mode and "acquire" the current position 164 by first initializing the map match function in step 308 then entering the acquisition mode in step 310. If there are solutions queued, then in step 316 the module 202 will run in Tracking Mode and find more possible solutions according to the direction of travel of vehicle 150.

In step 308, initializing the map match function consists of initializing the map feature and associated map feature queue 142. The map feature queue 142 is particularly important, since it holds the current map position 164, as determined by the Acquisition Mode, which serves as the current position 164 for the Tracking Mode. Then in step 310 the Acquisition Mode is entered.

In step 305, if a solution is found, in the next step 316 the Tracking Mode is entered, as shown in greater detail in FIG. 9 and discussed further below.

Referring now to FIG. 10, after entering Acquisition Mode in step 310, the Road Matching Module 202 first needs to locate an initial position for vehicle 150 on a road on map 172. To narrow down the search, in step 310, as shown in FIG. 6, an imaginary box 250 is superimposed on search area 252 on map 172. The northern and southern boundaries 254 and 256, respectively of the box 250 are defined by the boundaries of the strip (when map 172 is divided into smaller horizontal lines, the area between two horizontal lines is a strip). The side boundaries 257 are given by an offset in degrees from the GPS position 160. The area of box 250 is chosen to encompass all likely solutions, which typically means centering box 250 at the map position 164 corresponding substantially to the GPS position 160 and allowing the North-South boundaries 254 and 256 and East-West Boundaries 257 to be at least one-half the inaccuracy introduced by the Situational Awareness factor of the GPS System 111.

Referring also to FIG. 4, map 172 is described as a collection of various segments 170 connected at various nodes 171. (Note: For convenience, segments 170 are depicted as forming a rectangular grid. Seldom in real life are road segments 170 and their associated nodes 171 so well behaved.) Information describing nodes 171 and segments 170 are stored in interrelated node table 173 and segment table 175. Segment table 175 contains for each segment 170 a segment ID number and various descriptors, such as associated road name 224, segment travel time 228 and segment travel distance 226. Node table 173 includes for each node 171 a unique node ID number, position information (longitude and latitude), the number of segments 170 connected to the node 171 and an offset to the segment table 175 to find the segment IDs of these connecting segments 170. The node table 173 has the following form:

```
typedef struct
{
    int x;   - latitude
    int y;   - longitude
    int Num_segment; - number of segments connected to the node
    int offset_Segment_table; - offset to segment table to find the segment
    ID's of segments connected to this node
}NODETABLE_TABLE;
```

Once box 250 is established in step 310, in step 330 Road Matching Module 202 then searches each node 171 bound by the box 250, and every segment 170 connected to that node 171 and in step 332 check each such node 171 until a possible solution is found and the solution is inserted into the queue 142. Acquiring the correct map position 164 can be difficult because there are segments 170 representing roads 166 that may lie less than the Situational Awareness accuracy away from each other. In this case, it is possible to have more than one or two solutions, so in step 332 the module 202 will keep on checking all these possible solutions and eventually, most of them will drop out, either because the associated road 166 or road segment 170 has ended or the difference between the two roads 166 or road segments 170 has exceeded the Situational Awareness distance.

Referring now to FIG. 9, when entering the Tracking Mode in step 316, the Road Matching Module 202 first uses the solutions entered in the map feature queue 142 during Acquisition Mode. During travel of the vehicle 150, because of the Situational Awareness uncertainty of GPS device 111, the Module 202 searches ahead for possible segments 170 on which the vehicle 150 may next be traveling. These possible solutions are segments 170 that are connected directly to the current segment 170 of travel.

To search for these possible solutions, Road Matching Module 202 needs information about the current segment 170 traveled. Once the necessary information is acquired, in step 318 it accesses the map 172, or more precisely the node table 173, and finds the segments 170 connected to the node 171 connected to the current segment 170 and in step 320 adds these segments 170 to the queue 142 by adding to the relevant element 144 the segment points in step 322 and any new intersection points in step 324. In step 328, the Road Matching Module 202 then checks each of these segments 170 to find which segment 170 the vehicle 150 is actually traveling on. As is readily apparent, Tracking Mode is just a cycle, checking items 144 in the queue 142 the queue is empty, then the Road Matching Module runs in Acquisition mode again to find the current map position 164.

Software Modules: Details of the Routing Module

Referring now to FIGS. 1 through 17, Routing Module 204 constructs a route 158 between a source address 154 and a destination address 156. This route 158 is in the form of a series list of segments 170 on map 172 between addresses 154 and 156, including a list of road intersections, directions to turn and distances traveled for each road segment 170. In practice, the complexity of a given route 158 is limited by the routing method and the available working memory for controller 102. The user's application 90 will allocate memory and provide it to the Routing Module 204.

The available routing methods are Fastest, Local and Interstate. With the Fastest method, both distance and road quality are weighted to generate the route 158 with the shortest travel time. There is no preference weighting for highways. With the Local method, the fastest route 158 is calculated, but interstate highways are avoided. Similarly, with the Interstate method, the fastest route 158 is calculated, but with weighting strongly biased towards highway segments 170. With the Shortest method, all routing decisions are based on segment 170 length.

With a dynamic map 172, map 172 is updated to reflect changes in conditions that affect route 158, such as road construction, road improvement (reflecting that some roads to get better rather than worse), weather conditions and traffic conditions. On instructions from the Trip Management Module, Routing Module 104 will recalculate optimal route 158 to take into account any such changed conditions.

All three routing methods use the same algorithm, called Dijkstra's algorithm, the use and application of which is well known to those skilled in the relevant art. Dijkstra's Algorithm determines the shortest weighted path between two locations. With map 172, each segment 170 is "weighted" or given a "cost" according to its type or use (e.g., Interstate or local road) and travel time.

In operation, Routing Module 204 receives from Trip Management Module 200 the origin 154 and destination 156 of vehicle 150 in terms of segment table 175 data. Next, as depicted in flow chart in FIG. 12 and the diagram in FIG. 14, Routing Module 204 will search all nearby nodes 171 and segments 170 from both the origin 154 and the destination 156 and place them in a priority queue 146 (shown in FIG. 7) by weighted distance. (Note: As in FIG. 6, segments 170 and nodes 171 are depicted in a rectangular grid.) In this queue 146 the following information is placed for each such node 171:

Node id—ID number of node 171;
Segment id—ID number of segment 170 of road;
Seg_distance—distance or length of segment 170;
Weighted_distance—calculated weighted distance which is proportional to the length of the segment 170 and speed traveled on that segment 170.
Occupied—has values of 0 or 1, indicated node 171 is unoccupied or occupied, respectively, and the queue in which it belongs.
Known—flag if this node 171 has been iterated.
Direction—values of 0, 1 or 2, for determining which direction to go a road.
Road_class—road class, road use.
Unknown_forward_link_pointer to the next node 171 used during routing.
Unknown_backward_link_pointer to the previous node used during routing.
Backward_link_pointer to the previous node 171 for a solution.
Hash_link_pointer to location in node table 173 where node 171 is stored.

As shown in FIG. 15, for both the searches from the origin 154 and the destination 156, for each new node 171 searched, more segments 170 branch off, leading to more nodes 171. Eventually, as depicted in FIGS. 15 and 16, one or mores common node 171 used by both searches are found, and the optimal search route 158 is the aggregated optimal route 158 of these two search procedures. Routing Module 204 ends the searches if either device 100 runs out of memory 114 or memory in controller 102 to hold the two search queues or if the weighted distances of the other nodes 171 searched exceed the optimal route 158 discovered to date. As depicted In FIG. 17, once the optimal route 158 is calculated, information describing this route 158 is stored in the solution_index data in controller memory 102 or memory 114. This information includes the following:

Matched—flag if node 117 has been matched.
Start_index—pointer to node 171 at origin 154.
Start_seg—segment ID of first segment 170 from origin 154 node 171.
End_index—pointer to node 171 of ending segment 170.
Weighted_distance—weighted distance of solution.

Once Routing Module 204 has found the optimal route 158, it converts the route 158 into a series of instructions that can be conveyed to the user (typically as speech via TTS Converter 110, but also as a display on integral display 128 or the display of a device 105). Preferably the instructions for the user are generated in advance, after the optimal route 158 has been calculated but before vehicle 150 has begun traveling. Alternatively, instructions to the user can be generated "on the fly" while vehicle 150 is traveling (but, of course, before the instruction is needed).

As will be seen, in generating the instructions Routing Module 204 creates one or more trip_record files 223 in a Trip Record Array 222. Preferably each of these files 223 contains the following information:

Dir_onsign—direction on street sign.
Road_class—road class, road use.
Turn_angle—turn angle onto road.
Starting_angle—starting angle.
Road_id—roadname ID.
Starting_node—node of origin.
Starting_segment—ID of first segment 170 this file.
Ending_segment—ID of last segment 170 for this file.
Ending_node—ID of node where this file ends.
Distance—length of road.
Time—calculated time of travel on road.
Seg_count—number of segments on the road associated with this file.
Cell_pointer—pointer to route 158 cells.

In operation, first the function generate_trip_record searches down every node 171 in the optimal route 158, accesses the necessary information and translates it and then stores it in controller 102 memory or memory 114 in a file called trip_record 223. If certain nodes 171 and segments 170 belong to the same road name 224, trip_record file 223 is updated by adding the distance 226 of the new segment 170 and the time of travel 228 for that one road 166, and the ending_segment 170. Otherwise, if the next segment 170 on the route 158 is a new road name 224, a new trip_record file 223 is created that is linked to the previous trip_record file 223 in the array 222. This new file 223 contains the information describing the new road 160, until either another new road name 224 is encountered (and a series of one or more new trip_record files 223 are created, each linked to the previous file 223) or the destination address 156 is encountered.

Once the instructions have been parsed through to destination 156 (in the mode where instructions are developed before travel is begun), the instructions can be given to the user. This is done by the function generate_trip_ instructions. This functions access the trip_record files 223 in series and sets up an output string of directions, road names 224, distances 226 and time 228 for the TTS Converter 110 to convert to speech.

Software Modules: Details of the Trip Management Module

Referring now to FIGS. 1, 2, 4, 7 and 13, Trip Management Module 200 takes input from the Road Matching and Routing Modules 202 and 204. The output of Trip Management Module 200 is read by the Map Interface Module 206 to be displayed through the User Interface Module 212 and the TTS device 110.

Trip Management Module 200 has two modes. By default, module 200 will run in "NO_TRIP" mode, meaning that device 100 was not programmed for a trip, so there is no route 158 to calculate and track. In this mode, the module 200 receives from the Road Match Module 202 the current map position 164 and GPS position 162 and associated information, such as the name 224 of the current road 166, the next cross road 166, the current speed and heading, and the last longitude and latitude reading.

In contrast, in "TRIP" mode, the user has planned a trip and entered a destination 156 in navigation device 100. In this mode, module 200 is responsible for informing the user of directions for the preferred route 158 (using the display 128 and/or TTS device 110). To this end, module 200 compares the positions from the Road Matching and Routing Modules 202 and 204 and calculates directions and other information for the user. If a user misses a turn, Module 200 automatically recalculates a new route 159 from the current position 164 to the point nearest in the original route 158.

Trip Management Module 200 communicates with the other modules 199 through shared files 130 in Embedded Controller and Local Memory 102. Each file 130 includes semaphores 132 for indicating a revised entry. There are four types of files 130 shared among the modules 199: GPS Record Memory 134; Routing Memory 136; Routing Storage Memory 138 and Dir Memory 140. Dir Memory 140 includes the following data: current road name 224, distance until next turn, x,y coordinates of node/intersection 171 and turning direction. Routing Storage Memory 138 includes the current static route cell index, the number of route cells used, the number of trip records in the trip record array 222, and the array 218 of trip record indexes corresponding to route cell indexes 216. The Routing Memory 136 includes the route 158 type, the starting block and segment 170, and the ending block and segment 170. The GPS Record Memory 134 includes the last block number, the road 166 ID, the segment 170 ID, a direction flag, road numbers and names 224, and time stamps.

Referring also to the flow charts in FIGS. 11 and 18, in operation Trip Management Module 200 first in step 400 gets map position 164 and associated data from Road Match Module 202. Next in step 402, if the mode in "NO TRIP," in step 404 Trip Management Module 200 causes user to receive appropriate warnings, such as the road names 224, of upcoming cross roads 166 and the distance to these cross roads 166. Next in parallel steps 406 and 408 such information is conveyed to the user via the TTS Converter 110 and the Map Interface 206/User Interface 212, respectively. Meanwhile, in step 414 Trip Management Module continually processes the input from Road Matching Module 202. In particular, as vehicle 150 travels, Road Matching Module 202 initially acquires a match on a road segment 170 and in step 416 Trip Management Module 200 acquires the relevant information via the shared files 130 and associated semaphores 132. Thereafter, so long as the vehicle 150 stays on the same road 166 (a condition signified in FIG. 18 by step 418), in step 422 the user is provided cross road and distance warnings via TTS device 110 and Map Interface/User Interface Modules 206 and 212. When the vehicle 150 leaves that particular road 166, in step 420 the Trip Management Module 200 waits for the Road Matching Module 202 to regain tracking on the new road 166, as indicated to the Trip Management Module by Shared Files 130 and associated semaphores 132.

If TRIP mode, then in step 410 the TRIP mode features of module 200 are enabled, so that in state 412 trip instructions and information are conveyed to the user, via parallel steps 406 and 408 discussed above in reference to the warnings conveyed to the user in NO TRIP mode. As shown in greater detail in the flowchart in FIG. 19, after step 410 it is determined in step 424 whether the vehicle 150 is in route (e.g., by checking shared files 130 to see if vehicle 150 is in motion). If not, in step 426 the location of vehicle 150 is checked (again by querying the relevant shared files 130). If the location cannot be determined, return is made to step 410. Otherwise, the return is made to step 424.

In step 424, if vehicle 150 is in route, in step 428 it is determined whether the vehicle 150 is approaching the end of the trip (e.g., the end of route 158). (Of course, the "end" is a relative term.) If "yes," in step 430 the appropriate instructions are issued to the user. If not, in step 412 trip instructions for route 158 are processed. In particular, as shown in greater detail in "exploded" step 413, these instructions include any special treatment of side streets, freeways and freeway ramps. Next in parallel in steps 406 and 408 the relevant information for the user is conveyed via TTS device 110 and Map Server/User Interface Modules 206 and 212.

Software Modules: Details on the Map Interface, OS Interface and Embedded Map

Referring now to FIGS. 1 and 4, device 100 is typically used by the driver/passenger of a vehicle 150, such as a bicycle, motorcycle, bus, automobile or truck, to navigate a transportation pathway 152. Typically transportation pathway 152 is a road system that may include streets, roads, highways, bridges, overpasses, underpasses, intersections, parking lots, cul-de-sacs and any other such structures. (Alternatively, a person (not shown) traveling on foot along a path (not shown) or in a boat (not shown) along a waterway could use device 100.)

Referring now to FIGS. 1, 3 and 4, in FIG. 3 there is illustrated the process of producing the condensed map 172 contained in device 100 from a map 190 supplied by a commercial service, such as the NAVTECH database from Navigation Technologies Corporation. The first step 192 is to extract the relevant information 194 from the information 196 provided with map 190. Typical commercial maps 190 contain more information than needed for particular applications 90. For example, if a driver is transporting a truck load of steel beams, she most likely does not need a list of amusement parks and similar attractions, but may be very interested in a list of diesel fuel stations along the route 158. Typical information 194 considered relevant includes road names, road segments 170, intersections, road signs, zip codes, points of interest, and attributes. Attributes describe road class (highway or local), toll roads, disallowed turns, and restrictions that occur at certain hours of the day.

The next step 198 is to analyze the map information 194 for sources of likely routing errors and make provisions to reduce or minimize these errors. For example, in the case of an overpass, the resolution of Position Sensor 108 may not be adequate to place the vehicle 150 on the upper or lower road segment 170. Similarly, Position Sensor 108 may not have adequate resolution to distinguish between two substantially parallel roads, say a highway and a nearby access road. To distinguish the position with respect to a cross-over, step 198 would flag for Road Matching Module 202 the need to examine the relative direction of travel of vehicle 150 and perhaps the speed of vehicle 150 if one road has a different speed limit. To distinguish the position 164 with respect to the adjacent, substantially parallel roads, Road Matching Module 202 would be flagged to examine the speed of vehicle 150 and any divergent points between the segments 170 further in the direction of travel.

Preferably before map 172 is stored in memory 114 it is compressed, via a suitable compression application 199, by more than 90%. In operation, map 172 is accessed via the Map Interface 206. Map Interface 206 can uncompress the data, perform integrity checks, and provide information sets to the applications 90 (or to other modules). This information includes the following:

- Road segments 170, with information about each segment 170 with block number, zip code, class (local or freeway), etc.
- Road names 240
- Intersections of Roads 166
- Zip code and city directory
- Road signs with location (freeway entrances, freeway ramps)
- Restriction information (e.g., No Left Turn. Also, impossible turns due to road dividers, etc.)
- Detail points—surveyed latitude and longitude of each road segment 170
- Quadrant table—to locate which segments are contained in a certain area. This assists acquisition of a road 166 from GPS position 160.
- Toll road attribute list
- Points of Interest note that certain key fields, such as road name 240 and road segment 270, are common to several tables and lists, such as Field Trip Record 222 link all lists or tables given above, thus forming a network database.

A party developing applications 90 for device 100 has two choices for getting data from map 172 into the Map Interface 206 (for use by other software modules). If a memory-mapped cartridge is used for memory 114, the developer can use possible virtual address translation, bank select procedures, and reads the data directly from the device. Otherwise memory 114 is Smart Media, PCMCIA, Compact Flash or a hard drive, an appropriate file system would be installed which would then provide the raw data to the Map Interface 206.

Software Modules: Details on the User Interface

Referring now to FIGS. 1, 2, 5, 7 and 18, preferably User Interface Module 212 is implemented as a web browser 213 (depicted in FIG. 7). This has several advantages well known to one skilled in the relevant art. It forces a separation between data 183 being communicated to the user and the formatting and handling of that data 183 by the browser 213. The browser 213 is contained in its own module, and the menus (not shown) it displays become merely data 183. Menu data 183 can be held in data structures or files as desired by the application 90. Each "page" of data 183 the browser 213 sees describes menu text, prompts, and maps pushbuttons to program branches. Menu data 183 can also be remotely located, in other words, placed on a server 180 that the device 100 is communicating with. When menu data 183 are stored on a server 180, they can be maintained at the server 180, and any changes will affect all devices 100 accessing the data 183 on that server 180. Maintenance is therefore centralized. Any combination of local or server-based menu data 183 may be used. An enhancement to the browser 213 allows certain designated files (not shown) to be executed as code for special operations, so operations can be combined with menus.

Preferably browser 213 is modeled after the Wireless Access Protocol or WAP. While WAP is designed for text-only operation, typical of cell phones 109, preferably browser 213 is implemented in code extensible to include a graphics display with limited grayscale support (not shown). This permits the use of larger fonts, bitmapped fonts, and graphics for displaying maps. It is aimed at, and works well with, displays on PDAs 107. This disclosure is not limiting; further modifications will be apparent to one skilled in the art in the light of this disclosure, and are intended to fall within the scope of the appended claims.

What is claimed is:

1. A navigation aide device capable of conveying traveling instructions to a user in possession of the device to allow the user to navigate from a predetermined source position on a predetermined road map, containing road information, to a predetermined destination position on the map, along an optimal road route, under control of travel instructions spoken by the device, the device including:
    a. position sensor for sensing position of the device and reporting that position;
    b. text to speech converter;
    c. sound conveying device operably connected to the text to speech converter for conveying speech to the user;
    d. memory for storing a predetermined road map containing road information; and
    e. controller operably connected to the position sensor, text to speech converter and map memory for
        i. calculating an optimal road route between the source position and the destination position;
        ii. generating a series of text road travel instructions that describe the optimal route in terms of associated road information;
        iii. receiving the report of position by the position sensor during travel;
        iv. calculating the speed of the device and its direction of travel from the positions reported by the position sensor;
        v. determining the road map position corresponding to the reported position based on the position reported, the calculated speed, the calculated direction of travel and the road information;
        vi. conveying the series of text road instructions to the text to speech converter;
        vii. based on the road map position determined, controlling the text to speech converter to convey to the sound conveying device each of the series of text road instructions at a time before the travel has reached the map position corresponding to the particular text road instruction such that the user hears relevant road travel instructions in substantially a timely manner;
        viii. comparing the determined road map position to the optimal road route to determine if the actual travel route is deviating from the optimal route, calculating an optimal correction road route between the determined road map position and a position on the optimal road route, generating a series of text road travel instructions that describe the optimal correction road route, conveying the series of text road travel instructions that describe the optimal correction road route to the text to speech converter, and based on the road map position determined, controlling the text to speech converter to convey to the sound conveying device each of the series of correction road route text road instructions at a time before the travel has reached the map position corresponding to the particular correction road route text road instruction.

2. The device of claim 1, wherein the predetermined source position is determined by the controller, prior to travel, by receiving the report of position by the position sensor before travel and determining, as the source position, the road map position corresponding to the reported position based on the position reported and the road information.

3. The device of claim 1, wherein the device is capable of being carried within a vehicle; and the sound conveying device includes an interface suitable for being connected to the input of a sound system of a vehicle;

whereby the controller controls the sound conveying device such that road travel instructions being conveyed to the user are conveyed to the user via the sound system interface.

4. The device of claim 1, wherein the controller calculates an optimal road route between the source position and the destination position by calculating an optimal road route between the source position and one or more first arbitrary positions;

calculating an optimal road route between the destination position and one or more second arbitrary positions;

determining one or more matches between first arbitrary positions and second arbitrary positions; and determining the optimal road route from among the matches between first and second arbitrary positions.

5. The device of claim 1, wherein the device is being used in association with a predetermined application; and the predetermined road map contains road information that is a subset of all the road information available, with the subset being chosen based on its relevance to the predetermined application.

* * * * *